US008559117B2

(12) United States Patent
Arai

(10) Patent No.: US 8,559,117 B2
(45) Date of Patent: Oct. 15, 2013

(54) ZOOM LENS, OPTICAL APPARATUS AND METHOD FOR MANUFACTURING ZOOM LENS

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 30 days.

(21) Appl. No.: 13/094,634

(22) Filed: Apr. 26, 2011

(65) Prior Publication Data

US 2011/0261467 A1 Oct. 27, 2011

(30) Foreign Application Priority Data

Apr. 27, 2010 (JP) ................................ 2010-102209

(51) Int. Cl.
*G02B 15/14* (2006.01)

(52) U.S. Cl.
USPC .......................................... 359/684; 359/678

(58) Field of Classification Search
USPC ......................... 359/676, 681, 683, 684, 678
See application file for complete search history.

(56) References Cited

U.S. PATENT DOCUMENTS

2007/0070513 A1* 3/2007 Yamashita et al. ............ 359/676

FOREIGN PATENT DOCUMENTS

JP 2007-094136 A 4/2007

* cited by examiner

*Primary Examiner* — Alicia M Harrington
(74) *Attorney, Agent, or Firm* — Miles & Stockbridge P.C.

(57) ABSTRACT

A zoom lens ZL including an optical element P for deflecting an optical path, including, in order from an object: a first lens group G1 having positive refractive power; a second lens group G2 having negative refractive power; a third lens group G3 having positive refractive power; a fourth lens group G4 having positive refractive power; a fifth lens group G5 having negative refractive power; and a sixth lens group G6, wherein a conditional expression $0.10<fw/PL<0.45$ is satisfied, where fw denotes a focal length of the zoom lens ZL in a wide-angle end state, and PL denotes an optical path length of the optical element P for deflecting the optical path.

14 Claims, 23 Drawing Sheets

ZL
1 2 3 4 5 6 7 8 9 10 11 12 13 14 15 16 17 18 19 20 21 22 23 24 25 26 27 28 29 30 31 I
L11 P L12 L13 L21 L22 L23 L31 L32 L33 L41 L42 L51 L52 L61 LPF CV
G1(+) G2(−) S G3(+) G4(+) G5(−) ∞ G6(+)

ZL
I
CV
LPF
L61
L52
L51
L42
L41
L33
L32
L31
L23
L22
L21
L13
L12
L11
P
G6(+)
G5(−)
∞
G4(+)
G3(+)
S
G2(−)
G1(+)
1
2
3
4
5
6
7
8
9
10
11
12
13
14
15
16
17
18
19
20
21
22
23
24
25
26
27
28
29
30
31

Y=3. 25
Y=2. 77
Y=2. 28
Y=1. 63
Y=0. 0
0. 020
COMA ABERRATION
FNO=5. 62
SPHERICAL ABERRATION
Y=3. 25
ASTIGMATISM
Y=3. 25
5. 000%
DISTORTION
-0. 010
LATERAL CHROMATIC ABERRATION

FNO=3. 54
0. 200
SPHERICAL ABERRATION
Y=3. 25
0. 200
ASTIGMATISM
Y=3. 25
5. 000%
DISTORTION
Y=3. 25
Y=2. 77
Y=2. 28
Y=1. 63
Y=0. 0
-0. 020
COMA ABERRATION
-0. 010
LATERAL CHROMATIC ABERRATION

ZL
I
CV
LPF
L61
L52
L51
L42
L41
L33
L32
L31
L23
L22
L21
L13
L12
L11
P
G6(+)
G5(−)
G4(+)
G3(+)
S
G2(−)
G1(+)
∞

ZL
G1(+)
G2(−)
G3(+)
G4(+)
G5(−)
G6(+)
S
P
L11
L12
L13
L21
L22
L23
L31
L32
L33
L41
L42
L51
L52
L61
LPF
CV
I
∞

FNO=4. 01
0. 200
SPHERICAL ABERRATION
Y=3. 25
0. 200
ASTIGMATISM
Y=3. 25
5. 000%
DISTORTION
-0. 010
LATERAL CHROMATIC ABERRATION
Y=3. 25
Y=2. 77
Y=2. 28
Y=1. 63
Y=0. 0
0. 020
COMA ABERRATION

FNO=4.15
SPHERICAL ABERRATION
0.200
Y=3.25
ASTIGMATISM
0.200
Y=3.25
DISTORTION
5.000%
-0.010
LATERAL CHROMATIC ABERRATION
Y=3.25
Y=2.77
Y=2.28
Y=1.63
Y=0.0
0.020
COMA ABERRATION

ZOOM LENS, OPTICAL APPARATUS AND METHOD FOR MANUFACTURING ZOOM LENS

RELATED APPLICATIONS

This invention claims the benefit of Japanese Patent Application No. 2010-102209 which is hereby incorporated by reference.

TECHNICAL FIELD

The present invention relates to a zoom lens, an optical apparatus and a method for manufacturing the zoom lens.

TECHNICAL BACKGROUND

Recently portability is becoming important for such an optical apparatus as a digital still camera, and in order to implement smaller size, slimmer construction and a wider angle, a zoom lens, which is an image-capturing lens, is becoming smaller and has a wider angle. In this state, a zoom lens having an optical element, which can deflect an optical path about 90°, in a part of a lens system has been devised. If such a zoom lens is installed, the lens portion does not protrude from the camera main body when the zoom lens is shifted from a stored state to an operation state, and portability is superb even in the operation state. The zoom lens also contributes a lot to decreasing the size and thickness of the camera. An available zoom lens like this is a six-lens group type zoom lens (positive, negative, positive, positive, negative, positive) having, in order from an object, a first lens group having positive refractive power, a second lens group having negative refractive power, a third lens group having positive refractive power, a fourth lens group having positive refractive power, a fifth lens group having negative refractive power, and a sixth lens group having positive refractive power, for example (e.g. see Japanese Laid-open Patent Publication No. 2007-94136).

However in such conventional zoom lenses, a lens which has a wider angle of view and higher zoom ratio, while maintaining excellent optical performance, is demanded.

SUMMARY OF THE INVENTION

With the foregoing in view, it is an object of the present invention to provide a zoom lens which is compact and has high optical performance while having a wider angle of view and having a high zoom ratio, an optical apparatus including this zoom lens, and a method for manufacturing the zoom lens.

To achieve this object, a zoom lens of the present invention is a zoom lens including an optical element for deflecting an optical path, including, in order from an object: a first lens group having positive refractive power; a second lens group having negative refractive power; a third lens group having positive refractive power; a fourth lens group having positive refractive power; a fifth lens group having negative refractive power; and a sixth lens group, wherein a following conditional expression is satisfied:

$$0.10<fw/PL<0.45$$

where fw denotes a focal length of the zoom lens in a wide-angle end state, and PL denotes an optical path length of the optical element for deflecting the optical path.

In the above mentioned zoom lens, it is preferable that a following conditional expression be satisfied:

$$0.20<fG1/ft<0.55$$

where fG1 denotes a focal length of the first lens group, and ft denotes a focal length of the zoom lens in a telephoto end state.

In the above mentioned zoom lens, it is preferable that the first lens group comprise, in order from the object, a negative lens, the optical element for deflecting the optical path, a first positive lens and a second positive lens.

In the above mentioned zoom lens, it is preferable that a following conditional expression be satisfied:

$$0.9<fL12/fL13<5.0$$

where fL13 denotes a focal length of a positive lens closest to an image among the first lens group, and fL12 denotes a focal length of a positive lens closer to the object than the positive lens closest to the image among the first lens group.

In the above mentioned zoom lens, it is preferable that the first lens group, the third lens group and the sixth lens group be fixed respectively upon zooming from the wide-angle end state to the telephoto end state.

In the above mentioned zoom lens, it is preferable that an aperture stop for adjusting a quantity of light be disposed between the second lens group and the third lens group.

In the above mentioned zoom lens, it is preferable that the second lens group comprise, in order from the object, a first negative lens, a second negative lens and a positive lens.

In the above mentioned zoom lens, it is preferable that at least one of the fourth lens group and the fifth lens group be constituted only by a cemented lens.

In the above mentioned zoom lens, it is preferable that at least one of the fourth lens group and the fifth lens group be constituted only by a cemented lens of a positive lens and a negative lens.

An optical apparatus according to the present invention is an optical apparatus including a zoom lens for forming an image of an object on a predetermined plane, wherein the zoom lens is the zoom lens according to the present invention.

A method for manufacturing a zoom lens according to the present invention is a method for manufacturing a zoom lens including an optical element for deflecting an optical path, wherein the zoom lens comprises, in order from an object: a first lens group having positive refractive power; a second lens group having negative refractive power; a third lens group having positive refractive power; a fourth lens group having positive refractive power; a fifth lens group having negative refractive power; and a sixth lens group, and a following conditional expression is satisfied:

$$0.10<fw/PL<0.45$$

where fw denotes a focal length of the zoom lens in a wide-angle end state, and PL denotes an optical path length of the optical element for deflecting the optical path.

In the method for manufacturing a zoom lens according to the present invention, it is preferable that a following conditional expression be satisfied:

$$0.20<fG1/ft<0.55$$

where fG1 denotes a focal length of the first lens group, and ft denotes a focal length of the zoom lens in a telephoto end state.

In the method for manufacturing a zoom lens according to the present invention, it is preferable that the first lens group comprise, in order from the object, a negative lens, the optical element for deflecting the optical path, a first positive lens and a second positive lens.

In the method for manufacturing a zoom lens according to the present invention, it is preferable that a following conditional expression be satisfied:

$0.9 < fL12/fL13 < 5.0$ where fL13 denotes a focal length of a positive lens closest to an image among the first lens group, and fL12 denotes a focal length of a positive lens closer to the object than the positive lens closest to the image among the first lens group.

According to the present invention, a zoom lens which is compact and has high optical performance while having a wider angle of view and high zoom ratio can be implemented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

Figure 13A:
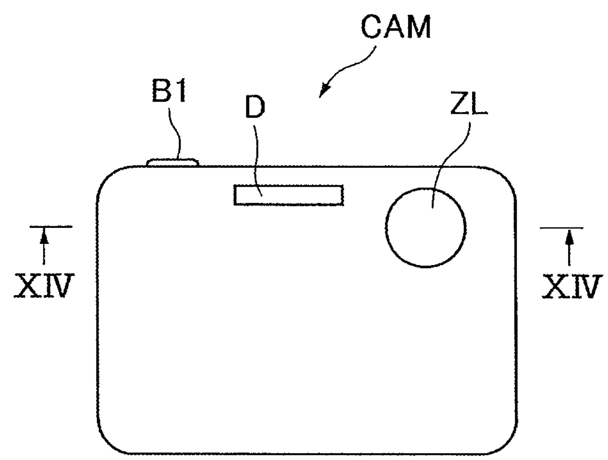
FIG. 13A is a front view of a digital still camera.
Figure 13B:
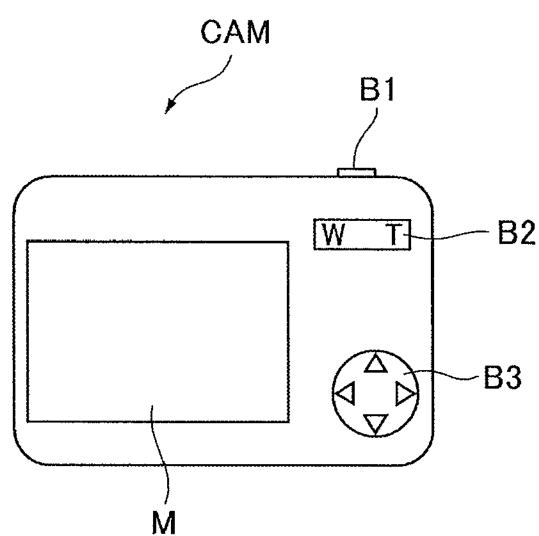
FIG. 13B is a rear view of the digital still camera.
Figure 14:
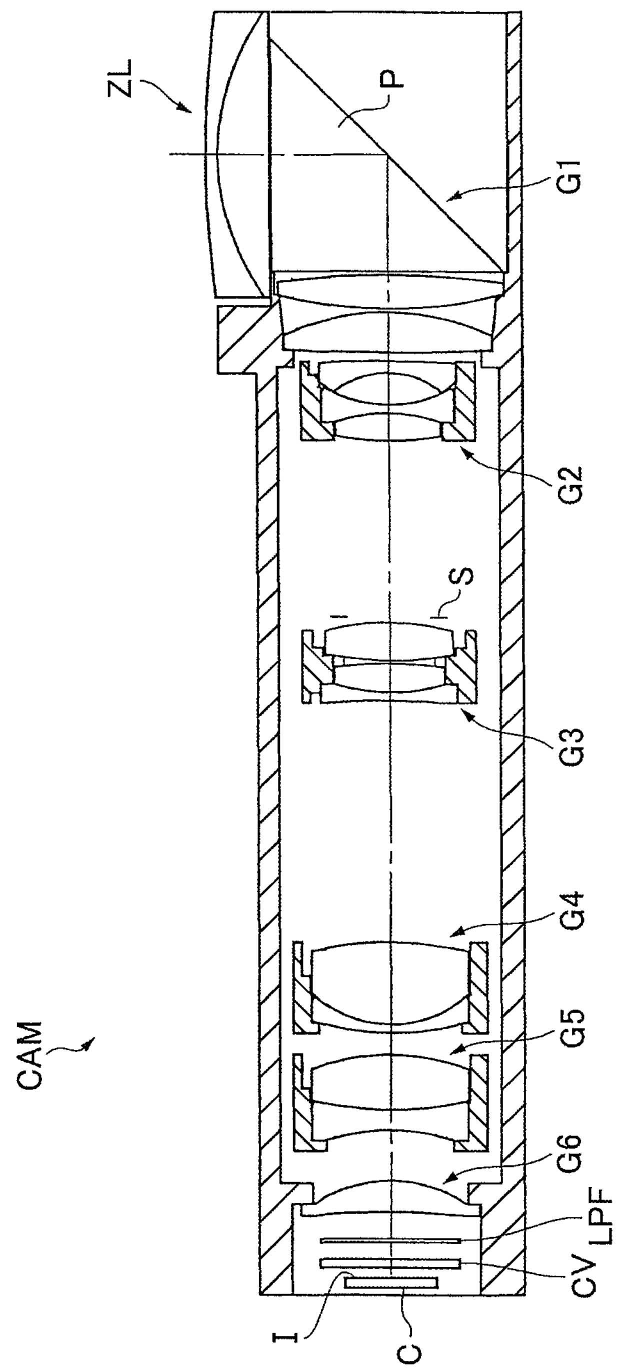
FIG. 14 is a cross-sectional view sectioned along the arrow XIV-XIV in FIG. 13A.

Preferred embodiments of the present invention will now be described with reference to the drawings. FIG. 13 and FIG. 14 show a digital still camera CAM having a zoom lens according to the present invention. FIG. 13A shows a front view of the digital still camera CAM, FIG. 13B shows a rear view of the digital still camera CAM. FIG. 14 is a cross-sectional view sectioned along the arrow XIV-XIV in FIG. 13A.

In the digital still camera CAM shown in FIG. 13 and FIG. 14, when a power button, which is not illustrated, is pressed, a shutter, which is not illustrated, of an image-capturing lens (ZL) is released, lights from an object (subject) are collected by the image-capturing lens (ZL), and form an image on a picture element C (e.g. CCD, CMOS) which is disposed on the image plane I. The object image formed on the picture element C is displayed on a liquid crystal monitor M disposed behind the digital still camera CAM. The user determines the composition of the object image while viewing the liquid crystal monitor M, then presses a release button B1 to capture the object image by the picture element C, and stores it in memory, which is not illustrated.

The image-capturing lens is constituted by a later mentioned zoom lens ZL according to the embodiment. In the digital still camera CAM, an auxiliary light emitting unit D, which emits auxiliary light when the object is dark, a wide (W)-tele (T) button B2 for zooming the image-capturing lens (zoom lens ZL) from the wide-angle end state (W) to the telephoto end state (T), and a function button B3, which is used for setting various conditions for the digital still camera CAM, are disposed.

The zoom lens ZL has an optical element P for deflecting an optical path, and comprises, in order from an object, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6. A low pass filter LPF for cutting off a spatial frequency higher than a critical resolution of a picture element C, and a cover glass CV of the picture element C, are disposed between the zoom lens ZL and the image plane I.

In the zoom lens ZL having this configuration, it is preferable that the following conditional expression (1) be satisfied, where fw denotes a focal length of the zoom lens ZL in a wide-angle end state, and PL denotes an optical path length of the optical element P for deflecting the optical path.

$$0.10<fw/PL<0.45 \quad (1)$$

By changing the distance between the first lens group G1 having positive refractive power and the second lens group G2 having negative refractive power using this configuration, zooming of the image formed by the first lens group G1 becomes possible. Here a shift in the image plane due to zooming can be corrected by disposing the third lens group G3 having positive refractive power for preventing a divergence of rays, and forming an image by the fourth lens group G4 having positive refractive power. Furthermore, by disposing the fifth lens group G5 having negative refractive power on the image side of the fourth lens group G4, the image forming position of the fourth lens group G4 can be closer to the object, so that the total length of the optical system can be decreased. Also by disposing the sixth lens group G6 having positive refractive power on the image side of the fifth len group G5, curvature of field can be corrected well. In this way, the total optical length can be decreased, and each aberration can be corrected well, therefore a zoom lens ZL, which is compact and has high optical performance while having a wide angel of view in the wide-angle end state and having about an ×7 zoom ratio, and an optical apparatus (digital still camera CAM) having this lens, can be implemented.

The conditional expression (1) specifies the focal length of the zoom lens ZL in the wide-angle end state and an optical path length of the optical element P for deflecting the optical path. If the condition exceeds the upper limit value of the conditional expression (1), the optical path length of the optical element P, for deflecting the optical path becomes short, and correction of the lateral chromatic aberration and the astigmatism becomes difficult, which is not desirable. If the condition is below the lower limit value of the conditional expression (1), on the other hand, the optical path length of the optical element P for deflecting the optical path becomes long, and the size of the entire optical system increases, which is not desirable. If the focal length of the zoom lens ZL in the wide-angle end state is decreased, correction of distortion becomes difficult, which is not desirable.

If the lower limit value of the conditional expression (1) is 0.15, or if the upper limit value of the conditional expression (1) is 0.40, the effect of the present invention can be exhibited better. If the lower limit value of the conditional expression (1) is 0.20, or if the upper limit value of the conditional expression (1) is 0.35, the effect of the present invention can be exhibited to the fullest.

In this zoom lens ZL, it is preferable that the following conditional expression (2) be satisfied:

$$0.20<fG1/ft<0.55 \quad (2)$$

where fG1 denotes a focal length of the first lens group G1, and ft denotes a focal length of the zoom lens ZL in the telephoto end state.

The conditional expression (2) specifies the ratio of the focal length of the first lens group G1 and the focal length of the zoom lens ZL in the telephoto end state. If the condition exceeds the upper limit value of the conditional expression (2), the focal length of the first lens group G1 becomes long, and the entire optical system becomes large, which is not desirable. Correction of astigmatism during zooming also becomes difficult, which is not desirable. If a condition is below the lower limit value of the conditional expression (2), on the other hand, the focal length of the first lens group G1 becomes short, and correction of fluctuation of lateral chromatic aberration during zooming becomes difficult, which is not desirable.

If the lower limit value of the conditional expression (2) is 0.25, or if the upper limit value of the conditional expression (2) is 0.50, the effect of the present invention can be exhibited better. If the lower limit value of the conditional expression (2) is 0.30, the effect of the present invention can be exhibited to the fullest.

In this zoom lens ZL, it is preferable that the first lens group G1 comprise, in order from the object, a negative lens, an optical element P for deflecting the optical path, a first positive lens and a second positive lens. By this configuration, the height of the ray which enters the optical element P for deflecting the optical path becomes lower, therefore the size of the optical element P for deflecting the optical path can be decreased. Furthermore, coma aberration in the wide-angle end state can be corrected well.

In this zoom lens ZL, it is preferable that the following conditional expression (3) be satisfied:

$$0.9<fL12/fL13<5.0 \quad (3)$$

where fL13 denotes a focal length of a positive lens closest to the image among the first lens group G1, and fL12 denotes a focal length of a positive lens closer to the object than the positive lens closest to the image.

The conditional expression (3) specifies the ratio of the focal length of the positive lens closest to the image among the first lens group G1, and the focal length of the positive lens closer to the object than the positive lens closest to the image. If the condition exceeds the upper limit value of the conditional expression (3), it becomes difficult to correct fluctuation of spherical aberration due to zooming, which is not desirable. If the condition is below the lower limit value of the conditional expression (3), on the other hand, it becomes difficult to correct fluctuation of coma aberration and lateral chromatic aberration due to zooming, which is not desirable.

If the lower limit value of the conditional expression (3) is 1.0, or if the upper limit value of the conditional expression (3) is 4.5, the effect of the present invention can be exhibited better. If the lower limit value of the conditional expression (3) is 1.5, or if the upper limit value of the conditional expression (3) is 4.0, the effect of the present invention can be exhibited to the fullest.

In this zoom lens ZL, it is preferable that, upon zooming from the wide-angle end state to the telephoto end state, the first lens group G1, the third lens group G3 and the sixth lens group G6 be fixed respectively. By constantly fixing the first lens group G1 which is closest to the object, upon focusing or upon zooming from the wide-angle end state to the telephoto end state, the structure can be simplified, since the largest lens group in the zoom lens ZL does not move. By fixing the third lens group G3 which is disposed to prevent a divergence of rays from the second lens group G2, an increase in luminous flux can be prevented, and the diameter of each lens group disposed on the image side can be decreased.

In this zoom lens ZL, it is preferable that an aperture stop S for adjusting the quantity of light be disposed between the second lens group G2 and the third lens group G3. Then the height of the ray which passes through the first lens group G1 in the wide-angle end state can be decreased, and the height of the ray which passes through the fourth lens group G4 in the telephoto end state can be decreased, therefore the size of the entire optical system can be decreased.

In this zoom lens ZL, it is preferable that the second lens group G2 comprise, in order from the object, a first negative lens, a second negative lens and a positive lens. Then fluctuation of curvature of field due to zooming can be corrected well. Since the thickness of the entire lens groups in the optical axis direction can be decreased, and the moving distance of the second lens group G2, upon zooming can be secured even more. The refractive power of the second lens group G2 need not be increased unnecessarily, and as a result, aberration which is generated in the second lens group G2 can be decreased.

In this zoom lens ZL, it is preferable that at least one of the fourth lens G4 and the fifth lens group G5 be constituted only by a cemented lens. Then fluctuation of coma aberration due to zooming can be corrected well.

Also in this zoom lens ZL, it is preferable that at least one of the fourth lens group G4 and the fifth lens group G5 be constituted only by a camera lens of a positive lens and a negative lens. Then fluctuation of coma aberration due to zooming can be corrected well.

Figure 15:
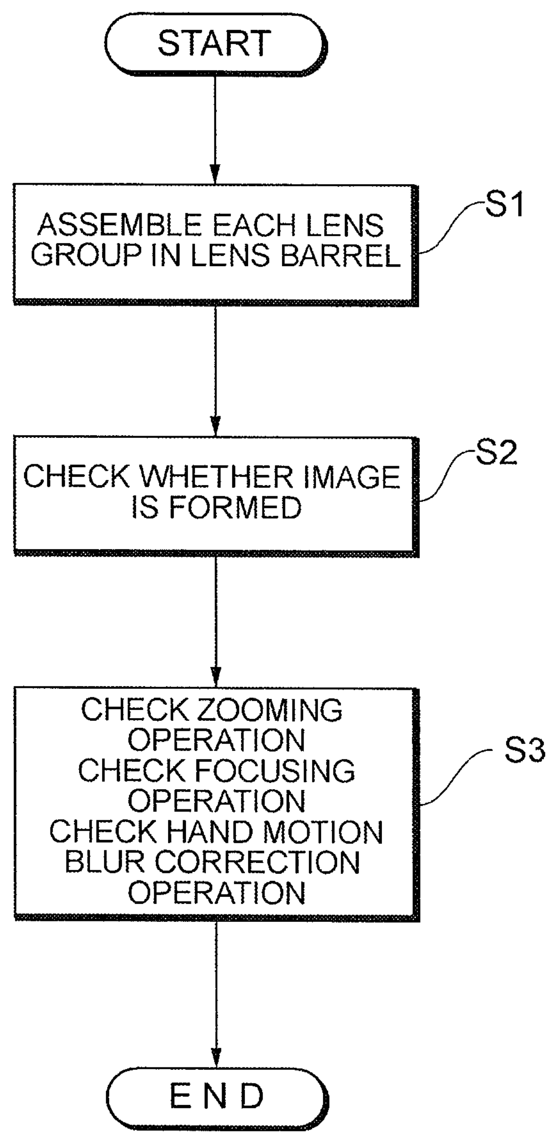
FIG. 15 is a flow chart depicting a method for manufacturing the zoom lens.

Now a method for manufacturing the zoom lens ZL having the above configuration will be described with reference to FIG. 15. First the first lens group G1, the second lens group G3, the third lens group G3, the fourth lens group G4, the fifth lens group G5 and the sixth lens group G6 of the present embodiment are assembled in a cylindrical lens barrel, which is enclosed in the camera main body in the horizontal position (step S1). When each lens is assembled in the lens barrel, each lens group may be assembled in the lens barrel one at a time in order along the optical axis, or a part or all of the lens groups may be integratedly held on a holding member, and then assembled in the lens barrel. After assembling each lens group in the lens barrel like this, it is checked whether the object image is formed in a state where each lens group is assembled in the lens barrel, that is, whether the center of each lens group is aligned (step S2). After checking whether the image is formed, various operations of the zoom lens ZL are checked (step S3).

Examples of the various operations are: a zoom operation in which lens groups for zooming (second lens group G2, fourth lens group G4 and fifth lens group G5 in this embodiment) move along the optical axis; a focusing operation in which a lens group which performs focusing from an object at a long distance to an object at a short distance (fifth lens group G5 in this embodiment) move along the optical axis; and a hand motion blur correction operation in which at least a part of the lenses move so as to have components orthogonal to the optical axis. In the present embodiment, upon zooming from the wide-angle end state to the telephoto end state, the first lens group G1, the third lens group G3 and the sixth lens group G6 are fixed. The sequence of checking the various operations are arbitrary. According to this manufacturing method, a zoom lens ZL which is compact and has high optical performance while having a wide angle of view in the wide-angle end state and having about an ×7 zoom ratio, can be implemented.

EXAMPLES

Example 1

Figure 1:
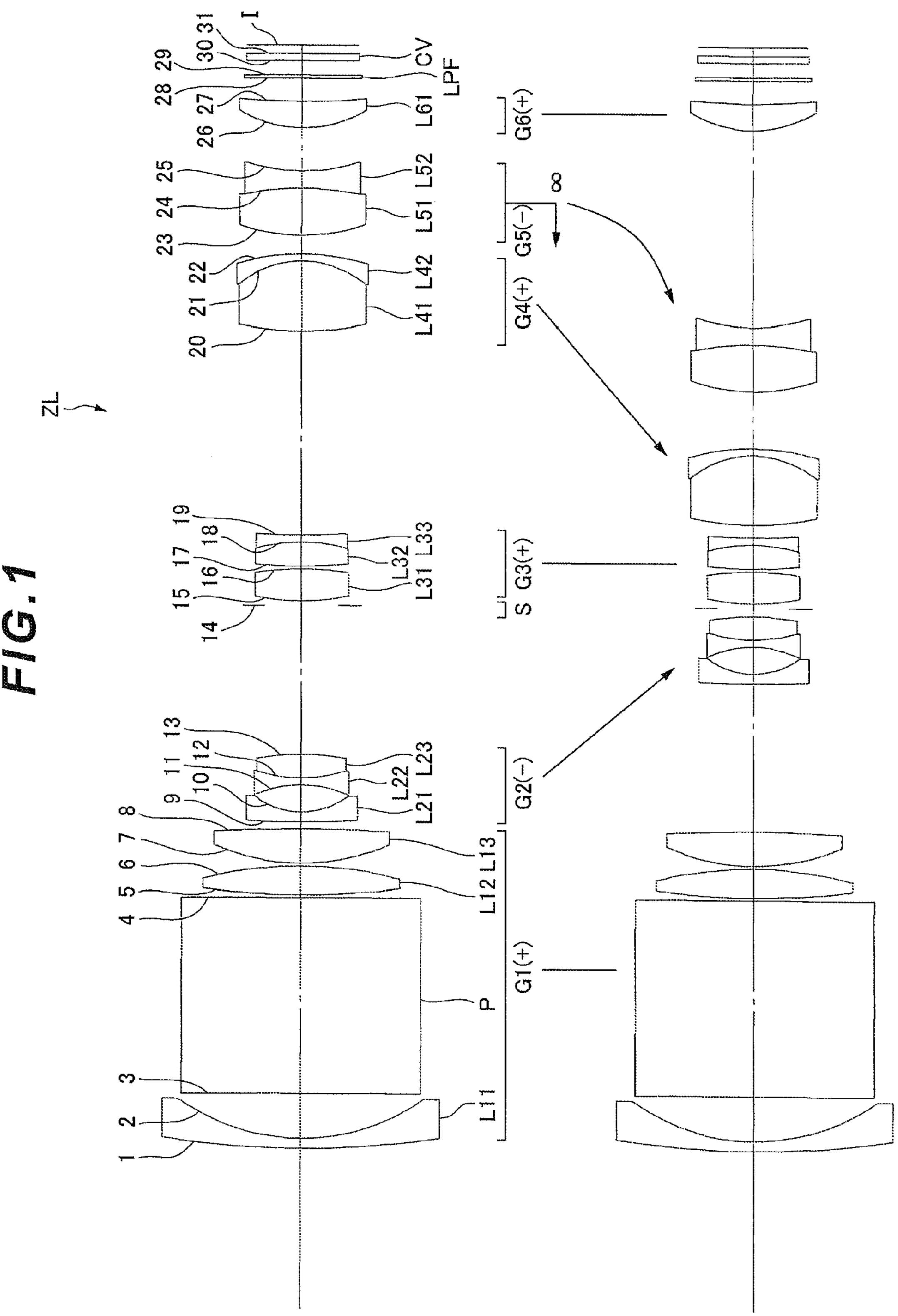
FIG. 1 is a diagram depicting a configuration and zoom locus of a zoom lens according to Example 1.

Each example of the present invention will now be described with reference to the accompanying drawings. Example 1 will be described first, with reference to FIG. 1 to FIG. 3 and Table 1. FIG. 1 is a diagram depicting a configuration and zoom locus of a zoom lens according to Example 1. The zoom lens ZL according to Example 1 comprises, in order from an object, a first lens group G1 having positive refractive power, a second lens group G2 having negative refractive power, an aperture stop S for adjusting the quantity of light, a third lens group G3 having positive refractive power, a fourth lens group G4 having positive refractive power, a fifth lens group G5 having negative refractive power, and a sixth lens group G6 having positive refractive power. The zoom lens ZL according to Example 1 deflects the optical path 90° as shown in FIG. 14, but FIG. 1 shows an expanded state thereof.

The first lens group G1 comprises, in order from the object, a negative meniscus lens L11 having a convex surface facing the object, a right angle prism P for deflecting the optical path 90°, a first positive lens L12 having a biconvex form, and a second positive lens L13 having a biconvex form, and the lens surfaces on both sides of the second positive lens L13 are aspherical. The second lens group G2 comprises, in order from the object, a negative meniscus lens L21 having a convex surface facing the object, and a cemented lens of a negative lens L22 having a biconcave form and a positive lens L23 having a biconvex form, and the image side lens surface of the negative meniscus lens L21 is aspherical. The third lens group G3 comprises, in order from the object, a first positive lens L31 having a biconvex form, and a cemented lens of a second positive lens L32 having a biconvex form and a negative lens L33 having a biconcave form, and the image side lens surface of the first positive lens L31 is aspherical.

The fourth lens group G4 comprises a cemented lens of a positive lens L41 having a biconvex form and a negative meniscus lens L42 having a convex surface facing the image, and the object side lens surface of the positive lens L41 is aspherical. The fifth lens group G5 comprises a cemented lens of a positive lens L51 having a biconvex form and a negative lens L52 having a biconcave form. Focusing from an object at infinity to an object at a finite distance is performed by moving the fifth lens group G5 along the optical axis. The sixth lens group G6 is constituted only by a positive meniscus lens L61 having a convex surface facing the object, and the object side lens surface of the positive meniscus lens L61 is aspherical.

The aperture stop S is disposed near the third lens group G3 between the second lens group G2 and the third lens group G3, and is fixed together with the third lens group G3 upon zooming from the wide-angle end state to the telephoto end state. A low pass filter LPF for cutting off a spatial frequency higher than the critical resolution of a picture element (e.g. CCD, CMOS) disposed on the image plane I, and a cover glass CV of the picture element, exist between the sixth lens group G6 and the image plane I.

In the zoom lens ZL having this configuration, upon zooming from the wide-angle end state to the telephoto end state, the first lens group G1, the aperture stop S, the third lens group G3 and the sixth lens group G6 are constantly fixed, and the second lens group G2, the fourth lens group G4 and the fifth lens group G5 move along the optical axis respectively. At this time, the second lens group G2 simply moves to the image side, the fourth lens group G4 simply moves to the object side, and the fifth lens group G5 moves to the object side while gradually increasing speed.

Table 1 to Table 4 shown below are tables listing the values of data on the zoom lenses according to Example 1 to Example 4. In [Lens Data] in each table, the surface number is the number of the lens surface counted from the object side, r is a radius of curvature of the lens surface, d is a distance between the lens surfaces, nd is a refractive index at d-line (wavelength $\lambda$=587.6 nm), and $\nu d$ is an Abbe number at d-line (wavelength $\lambda$=587.6 nm). "∞" in the radius of curvature indicates a plane or an aperture, and the refractive index of air "1.000000" is omitted.

In [Aspherical Data], the aspherical coefficient is given by the following conditional expression (4), where y denotes the height in a direction perpendicular to the optical axis, X(y) denotes a distance from the tangential plane at a vertex of the aspherical surface to the position on the aspherical surface at height y along the optical axis, R denotes a radius of curvature (paraxial radius of curvature) of a reference spherical surface, K is a conical coefficient, and Ai is an aspherical coefficient in degree i (i=4, 6, 8, 10). In each example, the aspherical coefficient A2 of degree 2 is 0, which is omitted here. In [Aspherical Data], [E−n] indicates "$\times 10^{-n}$" (n: integer).

$$X(y)=y^2/[R\times\{1+(1-K\times y^2/R^2)^{1/2}\}]+A4\times y^4+A6\times y^6+A8\times y^8+A10\times y^{10} \tag{4}$$

In [General Data], f is a focal length, FNo is an F number, ω is a half angle (maximum incident angle: unit is "°"), Y is an image height, TL is a total lens length (air conversion length), and Bf is a back focus (air conversion length). In [Zooming Data], D indicates a value of a variable distance in each of the wide-angle end state, intermediate focal length state and telephoto end state. In [Zoom Lens Group Data], G is a group number, "first surface of group" indicates a surface number of the surface closest to the object in each group, and "focal length of group" indicates a focal length of each group respectively. In all the data values shown below, "mm" is normally used for the unit of focal length f, radius of curvature r, surface distance d and other lengths, but the unit is not limited to "mm", since an equivalent optical performance is obtained even if an optical system is proportionally expanded or proportionally reduced. In other words, the unit need not be "mm", but another appropriate unit can be used instead. In all the examples hereinbelow, the same symbols as this example are used in the data values, for which description is omitted.

Table 1 shows each data of Example 1. The surface numbers 1 to 31 in Table 1 correspond to the surfaces 1 to 31 in FIG. 1, and the group numbers G1 to G6 in Table 1 correspond to each lens group G1 to G6 in FIG. 1. In Example 1, each lens surface of the seventh surface, the eighth surface, the tenth surface, the sixteenth surface, the twentieth surface and the twenty sixth surface are formed to be aspherical.

TABLE 1

[Lens Data]

| surface number | r | d | nd | νd |
|---|---|---|---|---|
| object surface | ∞ | | | |
| 1 | 60.2070 | 0.7000 | 1.922860 | 20.88 |
| 2 | 14.1660 | 3.1000 | 1.000000 | |
| 3 | ∞ | 13.7000 | 1.846663 | 23.78 |
| 4 | ∞ | 0.2000 | 1.000000 | |
| 5 | 50.1625 | 2.0000 | 1.516798 | 64.19 |
| 6 | −26.0906 | 0.2000 | 1.000000 | |
| 7(aspherical surface) | 14.2828 | 2.4000 | 1.622625 | 58.16 |
| 8(aspherical surface) | −106.1241 | D8 | 1.000000 | |
| 9 | 74.1110 | 0.7000 | 1.806100 | 40.73 |
| 10(aspherical surface) | 4.9365 | 1.9018 | 1.000000 | |
| 11 | −7.3348 | 0.5000 | 1.882997 | 40.76 |
| 12 | 9.5576 | 1.6500 | 1.922860 | 20.88 |
| 13 | −15.9965 | D13 | 1.000000 | |
| 14(aperture stop) | ∞ | 0.3000 | 1.000000 | |
| 15 | 14.4807 | 2.2500 | 1.743300 | 49.32 |
| 16(aspherical surface) | −19.8561 | 0.2000 | 1.000000 | |
| 17 | 27.5228 | 1.7000 | 1.497820 | 82.52 |
| 18 | −11.2585 | 0.5000 | 1.883000 | 40.81 |
| 19 | 45.0189 | D19 | 1.000000 | |
| 20(aspherical surface) | 18.9813 | 4.9000 | 1.693500 | 53.20 |
| 21 | −6.5875 | 0.5000 | 1.903658 | 31.31 |
| 22 | −15.1924 | D22 | 1.000000 | |
| 23 | 12.7047 | 3.3000 | 1.497820 | 82.52 |
| 24 | −18.9684 | 1.2000 | 1.903658 | 31.31 |
| 25 | 11.6274 | D25 | 1.000000 | |
| 26(aspherical surface) | 7.9361 | 1.8500 | 1.524440 | 56.21 |
| 27 | 45.8206 | 1.6300 | 1.000000 | |
| 28 | ∞ | 0.2100 | 1.516330 | 64.14 |
| 29 | ∞ | 1.0000 | 1.000000 | |
| 30 | ∞ | 0.5000 | 1.516330 | 64.14 |
| 31 | ∞ | Bf | 1.000000 | |
| image plane | ∞ | | | |

TABLE 1-continued

[Aspherical Data]

seventh surface

κ = 1.0000, A4 = −1.70400E−05, A6 = −8.89770E−08, A8 = 0.00000E+00, A10 = 0.00000E+00 eighth surface

κ = 1.0000, A4 = 1.73750E−06, A6 = 0.00000E+00, A8 = 0.00000E+00, A10 = 0.00000E+00 tenth surface

κ = 1.0000, A4 = −4.39940E−04, A6 = −1.35340E−05, A8 = −4.22400E−07, A10 = 0.00000E+00 sixteenth surface

κ = 1.0000, A4 = 5.15730E−05, A6 = 0.00000E+00, A8 = 0.00000E+00, A10 = 0.00000E+00 twentieth surface

κ = 1.0000, A4 = −9.41420E−06, A6 = −3.49020E−09, A8 = 4.95760E−08, A10 = 0.00000E+00 twenty sixth surface

κ = 1.0000, A4 = −1.45040E−04, A6 = 2.28900E−06, A8 = 0.00000E+00, A10 = 0.00000E+00

[General Data]
zoom ratio = 7.805

| | wide-angle end | intermediate position | intermediate position | telephoto end |
|---|---|---|---|---|
| f | 4.10000 | 6.00000 | 17.75999 | 31.99992 |
| FNo | 3.53467 | 3.70596 | 4.27448 | 5.61470 |
| ω | 40.42471 | 28.28719 | 10.22254 | 5.68536 |
| Y | 3.25000 | 3.25000 | 3.25000 | 3.25000 |
| TL | 77.1308 | 77.1308 | 77.1308 | 77.1308 |
| Bf | 3.6982 | 3.6982 | 3.6982 | 3.6982 |

[Zooming Data]

| variable distance | wide-angle end | intermediate position | intermediate position | telephoto end |
|---|---|---|---|---|
| D8 | 0.50000 | 3.17128 | 8.89963 | 10.39815 |
| D13 | 10.49837 | 7.82709 | 2.09876 | 0.60000 |
| D19 | 14.36018 | 11.39945 | 5.85976 | 0.90000 |
| D22 | 1.30000 | 2.29976 | 6.11100 | 4.00000 |
| D25 | 3.02230 | 4.98326 | 6.71171 | 13.78250 |

[Zoom Lens Group Data]

| group number | first surface of group | focal length of group |
|---|---|---|
| G1 | 1 | 13.44286 |
| G2 | 9 | −4.83153 |
| G3 | 15 | 16.60927 |
| G4 | 20 | 16.37353 |
| G5 | 23 | −19.83696 |
| G6 | 26 | 17.99998 |

[Conditional Expression Correspondence Value]

conditional expression (1)fw/PL = 0.29928
conditional expression (2)fG1/ft = 0.42009
conditional expression (3)fL12/fL13 = 1.64475

In this way, all the conditional expressions (1) to (3) are satisfied in this example.

Figure 2A:
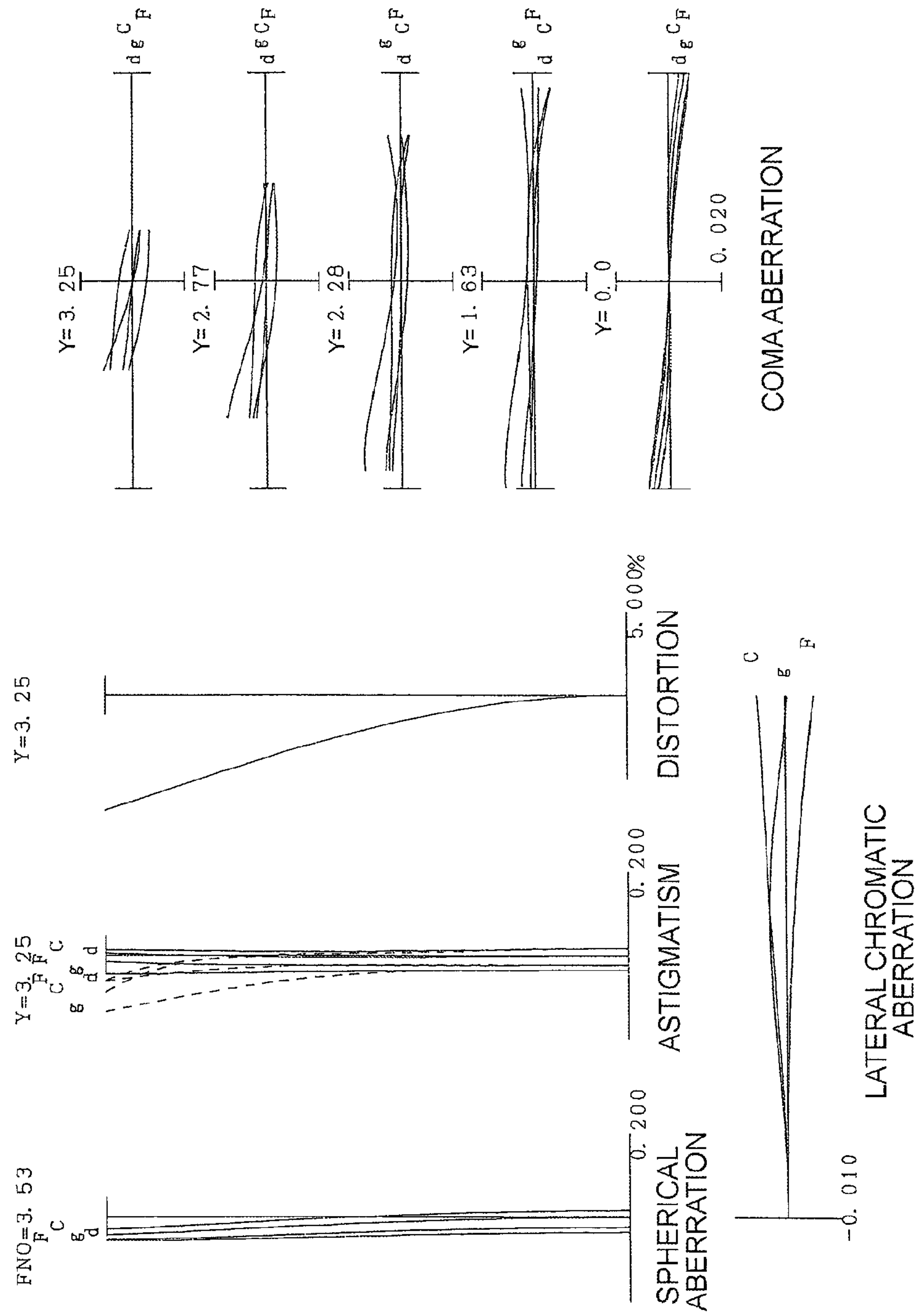
FIG. 2A are graphs showing various aberrations of the zoom lens according to Example 1 upon focusing on infinity in the wide-angle end state, and FIG. 2B are graphs showing various aberrations of the zoom lens upon focusing on infinity in the intermediate focal length state on the wide-angle end side.
Figure 2B:
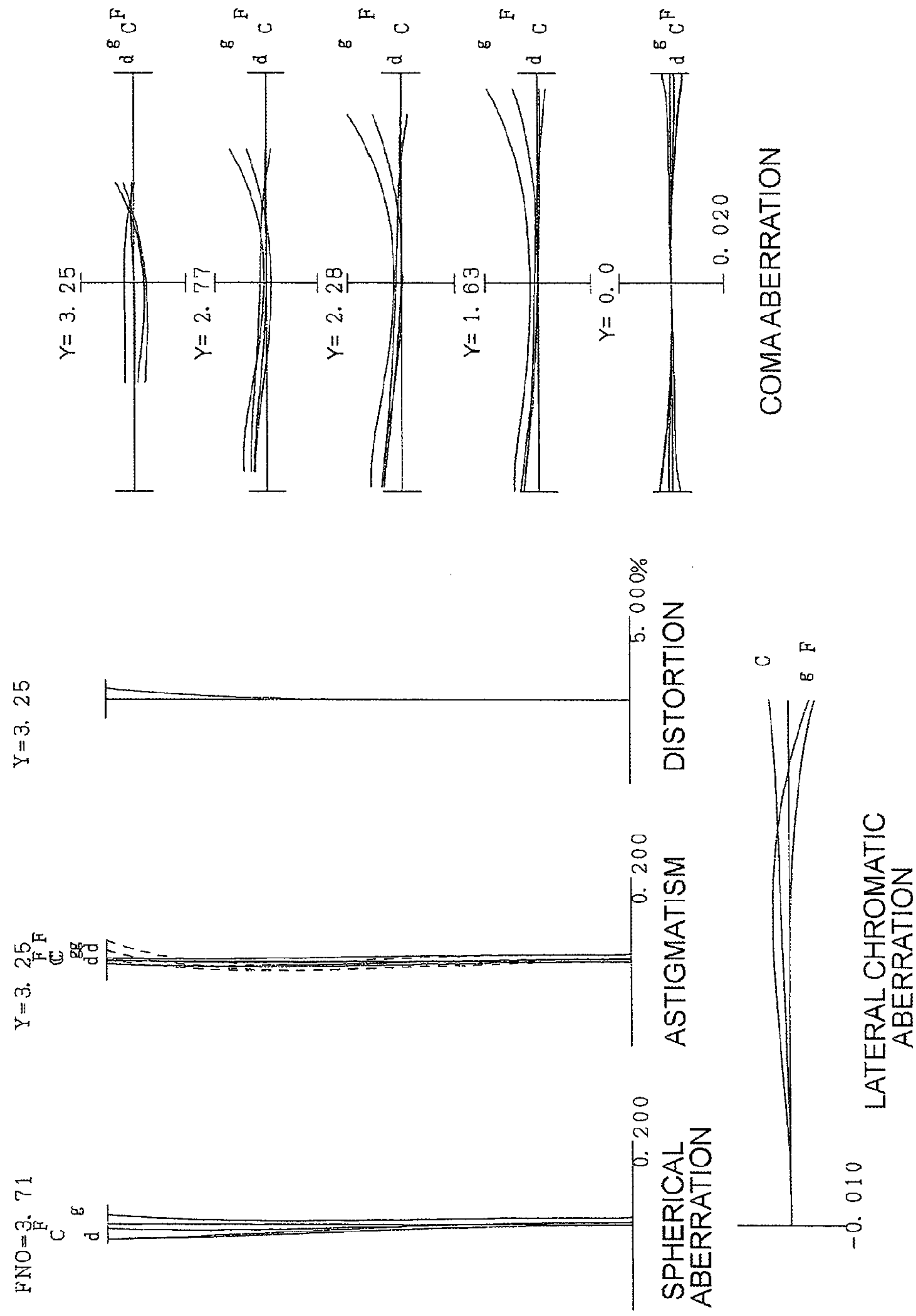
Figure 3A:
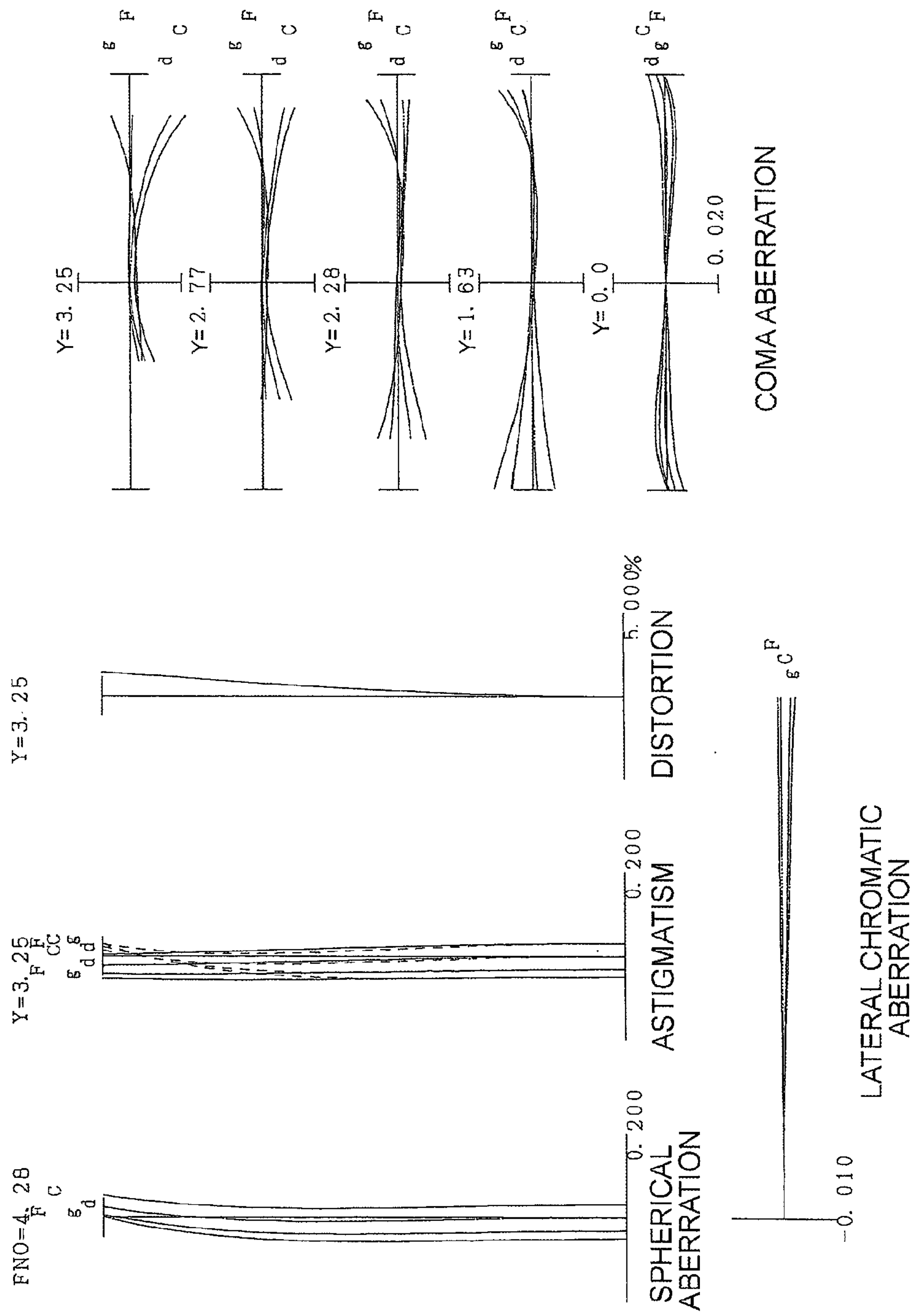
FIG. 3A are graphs showing various aberrations of the zoom lens according to Example 1 upon focusing on infinity in the intermediate focal length state on the telephoto end side, and FIG. 3B are graphs showing various aberrations of the zoom lens upon focusing on infinity in the telephoto end state.
Figure 3B:
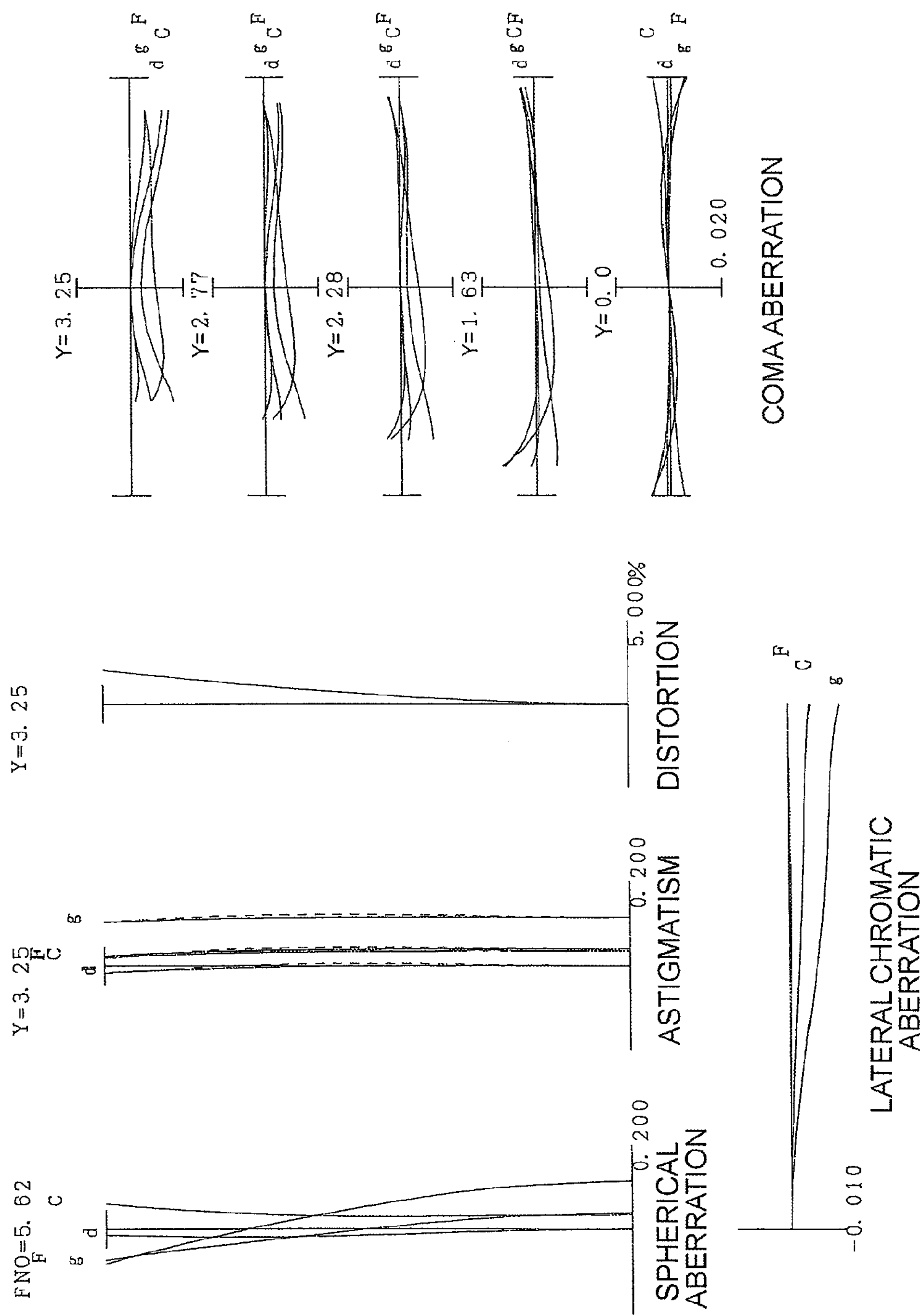

FIG. 2 to FIG. 3 are graphs showing various aberrations of the zoom lens ZL according to Example 1. In other words, FIG. 2A, are graphs showing various aberrations of the zoom lens ZL upon focusing on infinity in the wide-angle end state (f=4.10 mm), FIG. 2B are graphs showing various aberrations of the zoom lens ZL upon focusing on infinity in the intermediate focal length state on the wide-angle end side (f=6.00 mm), FIG. 3A are graphs showing various aberrations of the zoom lens ZL upon focusing on infinity in the intermediate focal length state on the telephoto end side (f=17.76 mm), and FIG. 3B are graphs showing various aberrations of the zoom lens ZL upon focusing on infinity in the telephoto end state (f=32.00 mm). In each graph showing aberrations, FNo indicates an F number, and Y indicates an image height. In each graph showing spherical aberrations, the sold line indicates spherical aberration. In the graph showing astigmatism, the solid line indicates the sagittal image surface, and the broken line indicates the meridional image surface. In the graph showing coma aberration, the solid line indicates the meridional coma. In each graph showing aberrations, d denotes an aberration at d-line (λ=587.6 nm), g denotes aberration at g-line (λ=435.8 nm), C denotes aberration at C-line (λ=656.3 nm) and F denotes aberration at F-line (λ=486.1 nm). The description on the graphs showing aberrations is the same for other examples, and is therefore omitted in the other examples.

As seen in each graph showing aberrations according to Example 1, various aberrations are corrected well in each focal length state from the wide-angle end state to the telephoto end state, indicating the presence of excellent optical performance. As a result, excellent optical performance is assured for a digital still camera 1 as well, by installing the zoom lens ZL of Example 1.

Example 2

Figure 4:
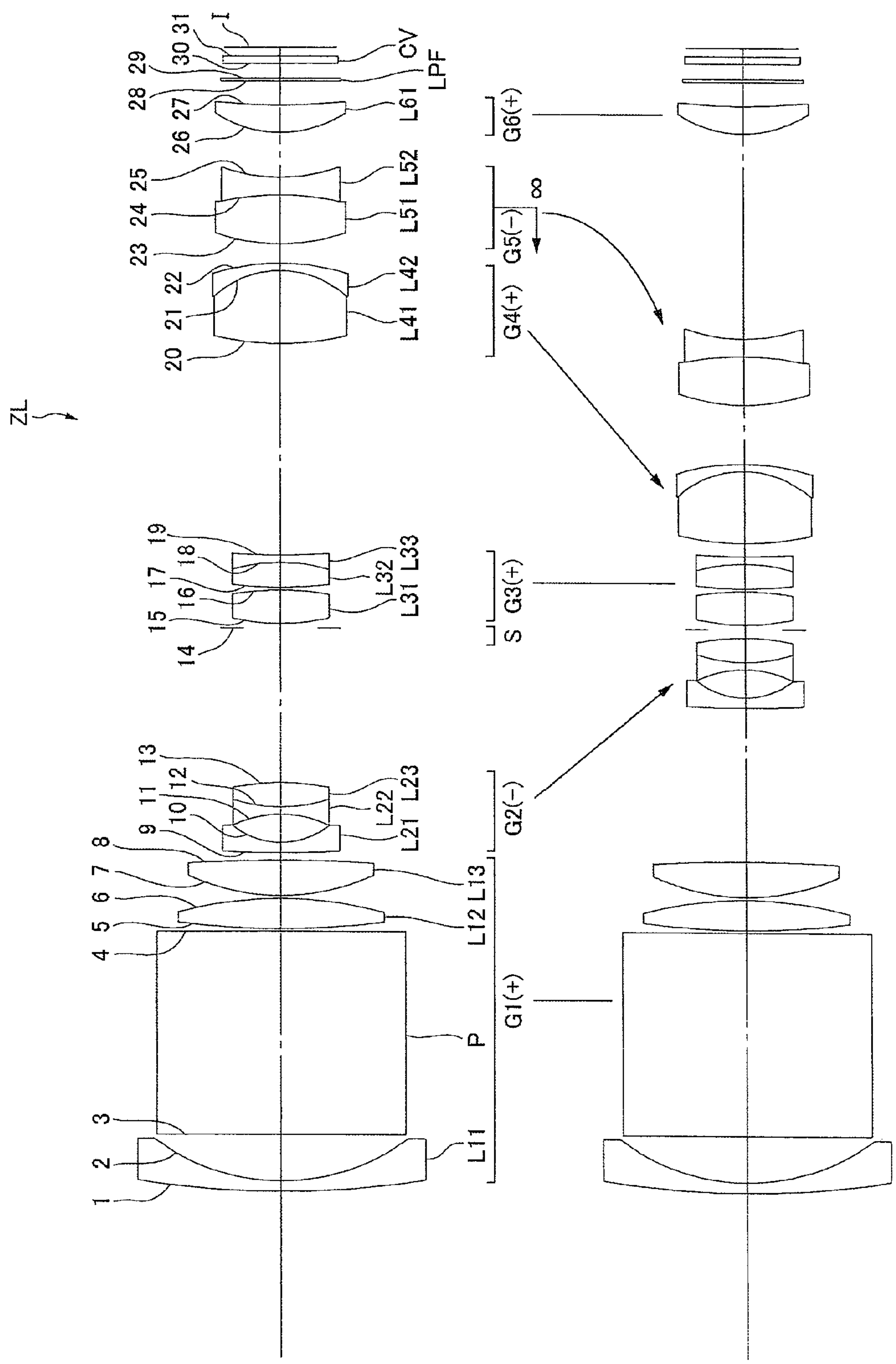
FIG. 4 is a diagram depicting a configuration and zoom locus of a zoom lens according to Example 2.

Example 2 of the present invention will now be described with reference to FIG. 4 to FIG. 6 and Table 2. FIG. 4 is a diagram depicting a configuration and zoom locus of a zoom lens according to Example 2. The zoom lens of Example 2 has a same configuration as the zoom lens of Example 1, and therefore each composing element is denoted with a same reference symbol as Example 1, and detailed description thereof is omitted. The zoom lens according to Example 2 deflects the optical path 90° as shown in FIG. 14, but FIG. 4 shows an expanded state thereof.

Table 2 below shows each data of Example 2. The surface numbers 1 to 31 in Table 2 correspond to surfaces 1 to 31 in FIG. 4, and the group numbers G1 to G6 in Table 2 correspond to each lens group G1 to G6 in FIG. 4. In Example 2, each lens surface of the seventh surface, the eighth surface, the tenth surface, the sixteenth surface, the twentieth surface and the twenty sixth surface are formed to be aspherical.

TABLE 2

[Lens Data]

| surface number | r | d | nd | νd |
|---|---|---|---|---|
| object surface | ∞ | | | |
| 1 | 60.3713 | 0.7000 | 1.922860 | 20.88 |
| 2 | 14.1882 | 3.1000 | 1.000000 | |
| 3 | ∞ | 13.7000 | 1.846663 | 23.78 |
| 4 | ∞ | 0.2000 | 1.000000 | |
| 5 | 53.2776 | 2.0000 | 1.516798 | 64.19 |
| 6 | −26.0830 | 0.2000 | 1.000000 | |
| 7(aspherical surface) | 14.2625 | 2.4000 | 1.622625 | 58.16 |

TABLE 2-continued

| surface number | r | d | nd | νd |
|---|---|---|---|---|
| 8(aspherical surface) | −98.9219 | D8 | 1.000000 | |
| 9 | 67.3385 | 0.7000 | 1.806100 | 40.73 |
| 10(aspherical surface) | 4.9205 | 1.9112 | 1.000000 | |
| 11 | −7.2580 | 0.5000 | 1.882997 | 40.76 |
| 12 | 9.7095 | 1.6500 | 1.922860 | 20.88 |
| 13 | −15.7450 | D13 | 1.000000 | |
| 14(aperture stop) | ∞ | 0.3000 | 1.000000 | |
| 15 | 14.4712 | 2.2500 | 1.743300 | 49.32 |
| 16(aspherical surface) | −19.8969 | 0.2000 | 1.000000 | |
| 17 | 28.1162 | 1.7000 | 1.497820 | 82.52 |
| 18 | −11.1653 | 0.5000 | 1.883000 | 40.81 |
| 19 | 46.6764 | D19 | 1.000000 | |
| 20(aspherical surface) | 18.9848 | 4.9000 | 1.693500 | 53.20 |
| 21 | −6.5818 | 0.5000 | 1.903658 | 31.31 |
| 22 | −15.2178 | D22 | 1.000000 | |
| 23 | 12.7177 | 3.3000 | 1.497820 | 82.52 |
| 24 | −19.1165 | 1.2000 | 1.903658 | 31.31 |
| 25 | 11.5718 | D25 | 1.000000 | |
| 26(aspherical surface) | 7.7297 | 1.8500 | 1.524440 | 56.21 |
| 27 | 39.1550 | 1.6300 | 1.000000 | |
| 28 | ∞ | 0.2100 | 1.516330 | 64.14 |
| 29 | ∞ | 1.0000 | 1.000000 | |
| 30 | ∞ | 0.5000 | 1.516330 | 64.14 |
| 31 | ∞ | Bf | 1.000000 | |
| image plane | ∞ | | | |

[Aspherical Data]

seventh surface

κ = 1.0000, A4 = −1.83290E−05, A6 = −9.76470E−08, A8 = 0.00000E+00, A10 = 0.00000E+00 eighth surface

κ = 1.0000, A4 = 8.90370E−07, A6 = 0.00000E+00, A8 = 0.00000E+00, A10 = 0.00000E+00 tenth surface

κ = 1.0000, A4 = −4.43920E−04, A6 = −1.30940E−05, A8 = −5.06870E−07, A10 = 0.00000E+00 sixteenth surface

κ = 1.0000, A4 = 5.02500E−05, A6 = 0.00000E+00, A8 = 0.00000E+00, A10 = 0.00000E+00 twentieth surface

κ = 1.0000, A4 = −9.46170E−06, A6 = 5.86370E−08, A8 = 4.81110E−08, A10 = 0.00000E+00 twenty sixth surface

κ = 1.0000, A4 = −1.41880E−04, A6 = 2.14860E−06, A8 = 0.00000E+00, A10 = 0.00000E+00

[General Data]
zoom ratio = 7.805

| | wide-angle end | intermediate position | intermediate position | telephoto end |
|---|---|---|---|---|
| f | 4.09999 | 5.99999 | 17.75998 | 31.99993 |
| FNo | 3.53970 | 3.71093 | 4.28056 | 5.62049 |
| ω | 40.42367 | 28.28724 | 10.23112 | 5.69028 |
| Y | 3.25000 | 3.25000 | 3.25000 | 3.25000 |
| TL | 77.196 | 77.196 | 77.196 | 77.196 |
| Bf | 3.6982 | 3.6982 | 3.6982 | 3.6977 |

[Zooming Data]

| variable distance | wide-angle end | intemediate position | intermediate position | telephoto end |
|---|---|---|---|---|
| D8 | 0.50000 | 3.17823 | 8.91953 | 10.42347 |
| D13 | 10.52365 | 7.84542 | 2.10413 | 0.60000 |
| D19 | 14.39067 | 11.42325 | 5.87448 | 0.90000 |
| D22 | 1.30000 | 2.30651 | 6.10609 | 4.00000 |
| D25 | 3.02227 | 4.98318 | 6.73236 | 13.81296 |

[Zoom Lens Group Data]

| group number | first surface of group | focal length of group |
|---|---|---|

TABLE 2-continued

| | | |
|---|---|---|
| G1 | 1 | 13.45700 |
| G2 | 9 | −4.84291 |
| G3 | 15 | 16.63694 |
| G4 | 20 | 16.40556 |
| G5 | 23 | −19.74723 |
| G6 | 26 | 17.99978 |

[Conditional Expression Correspondence Value]

conditional expression (1)fw/PL = 0.29926
conditional expression (2)fG1/ft = 0.42053
conditional expression (3)fL12/fL13 = 1.69317

In this way, all the conditional expressions (1) to (3) are satisfied in this example.

Figure 5A:
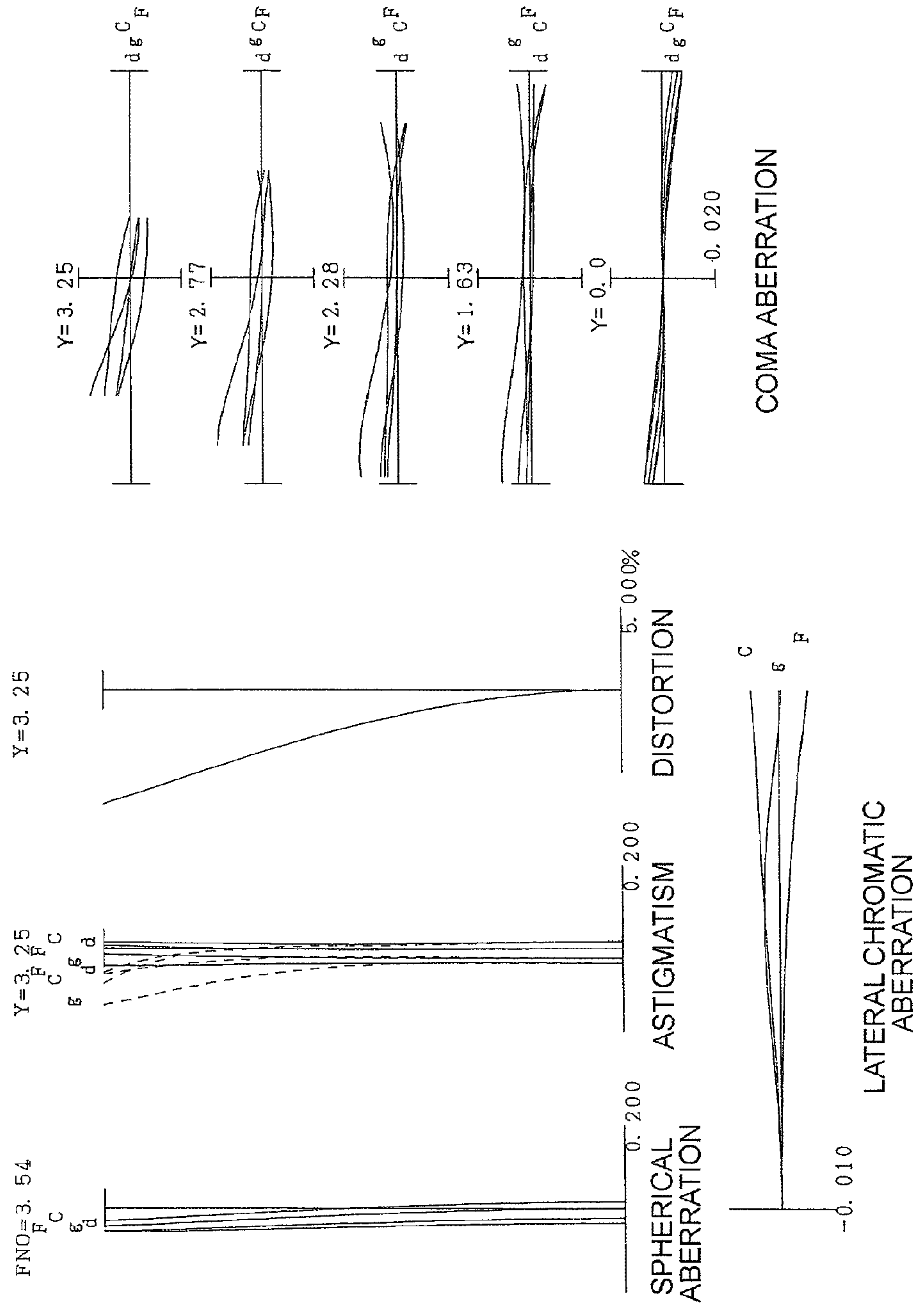
FIG. 5A are graphs showing various aberrations of the zoom lens according to Example 2 upon focusing on infinity in the wide-angle end state, and FIG. 5B are graphs showing various aberrations of the zoom lens upon focusing on infinity in the intermediate focal length state on the wide-angle end side.
Figure 5B:
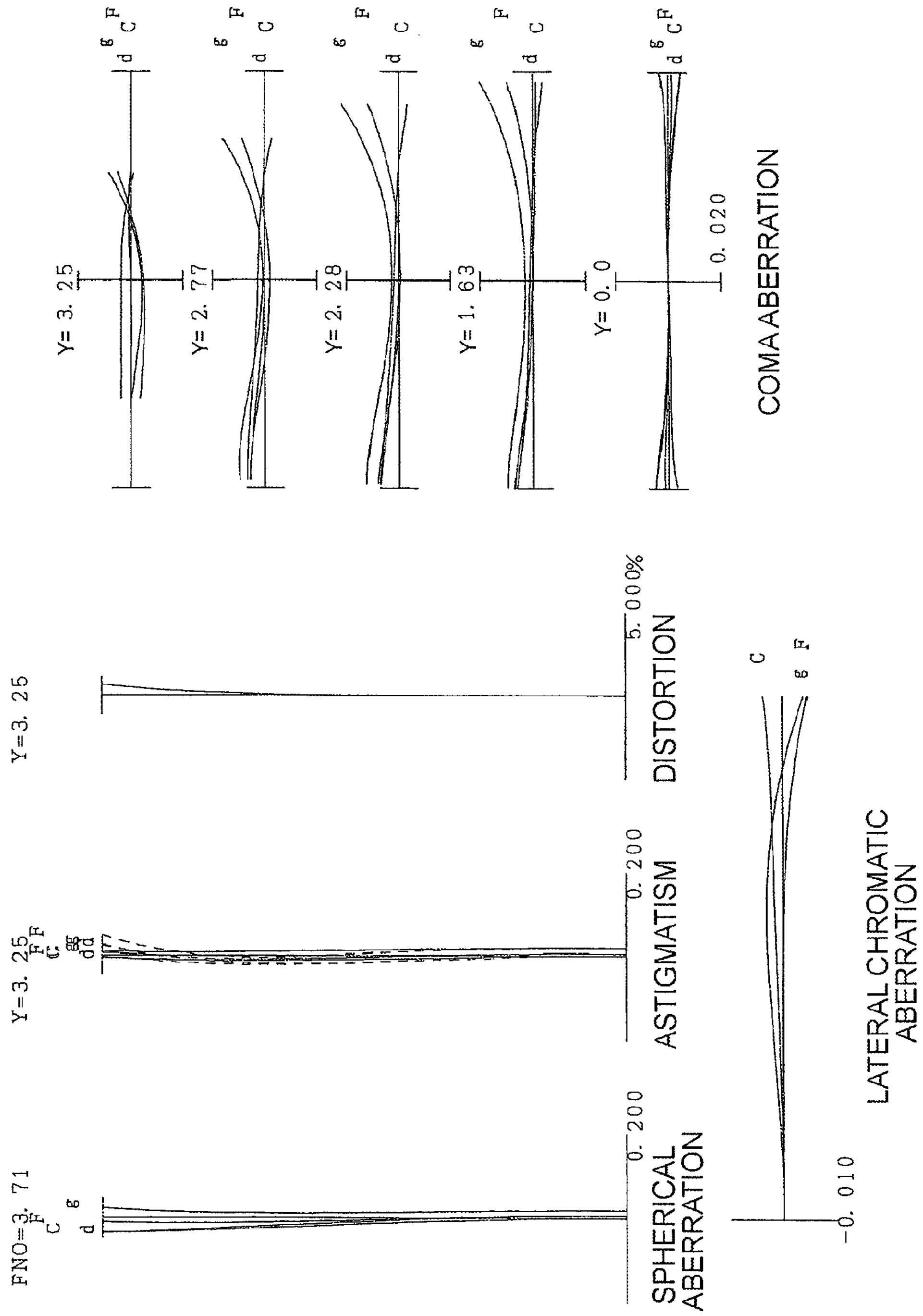
Figure 6A:
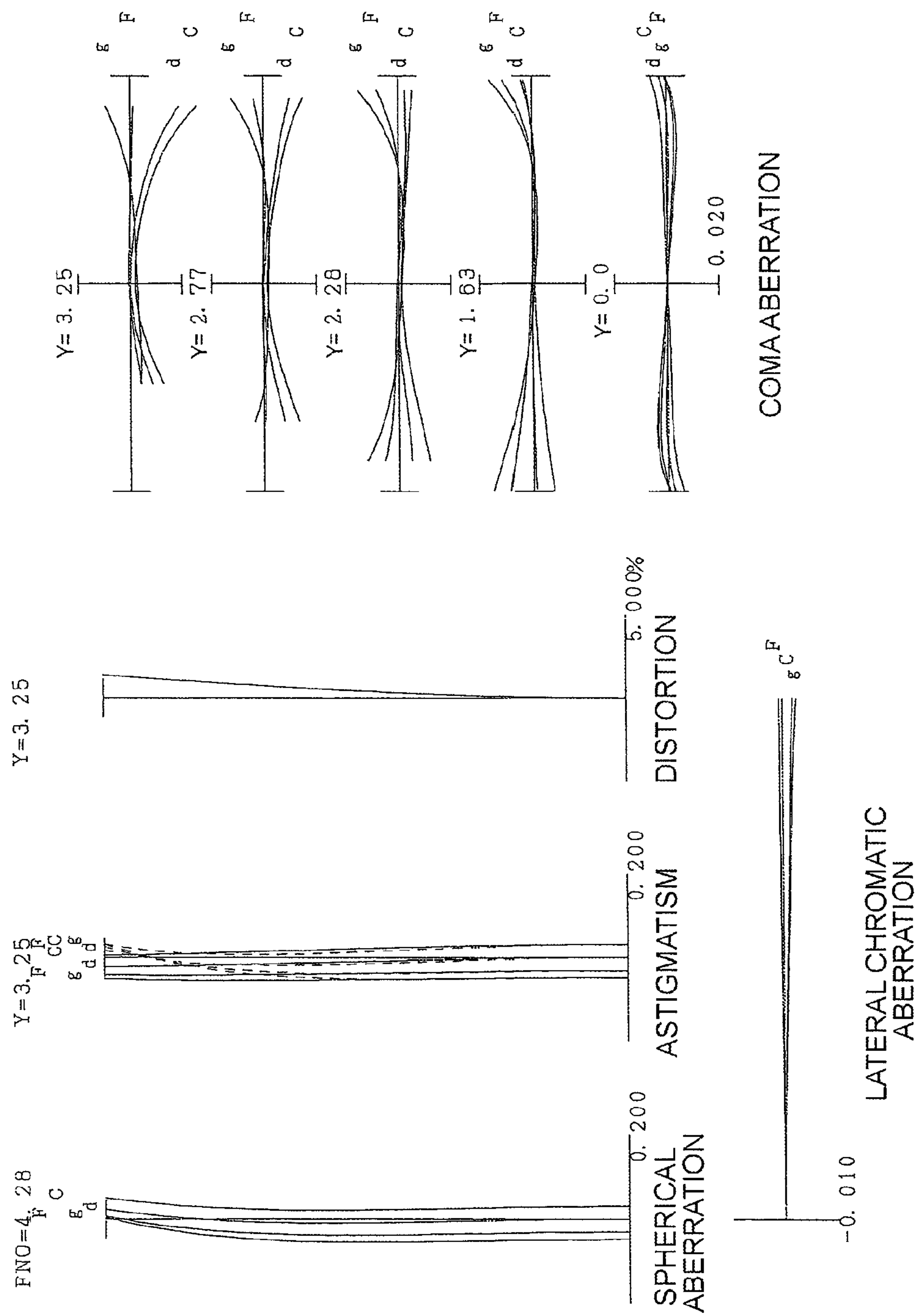
FIG. 6A are graphs showing various aberrations of the zoom lens according to Example 2 upon focusing on infinity in the intermediate focal length state on the telephoto end side, and FIG. 6B are graphs showing various aberrations of the zoom lens upon focusing on infinity in the telephoto end state.
Figure 6B:
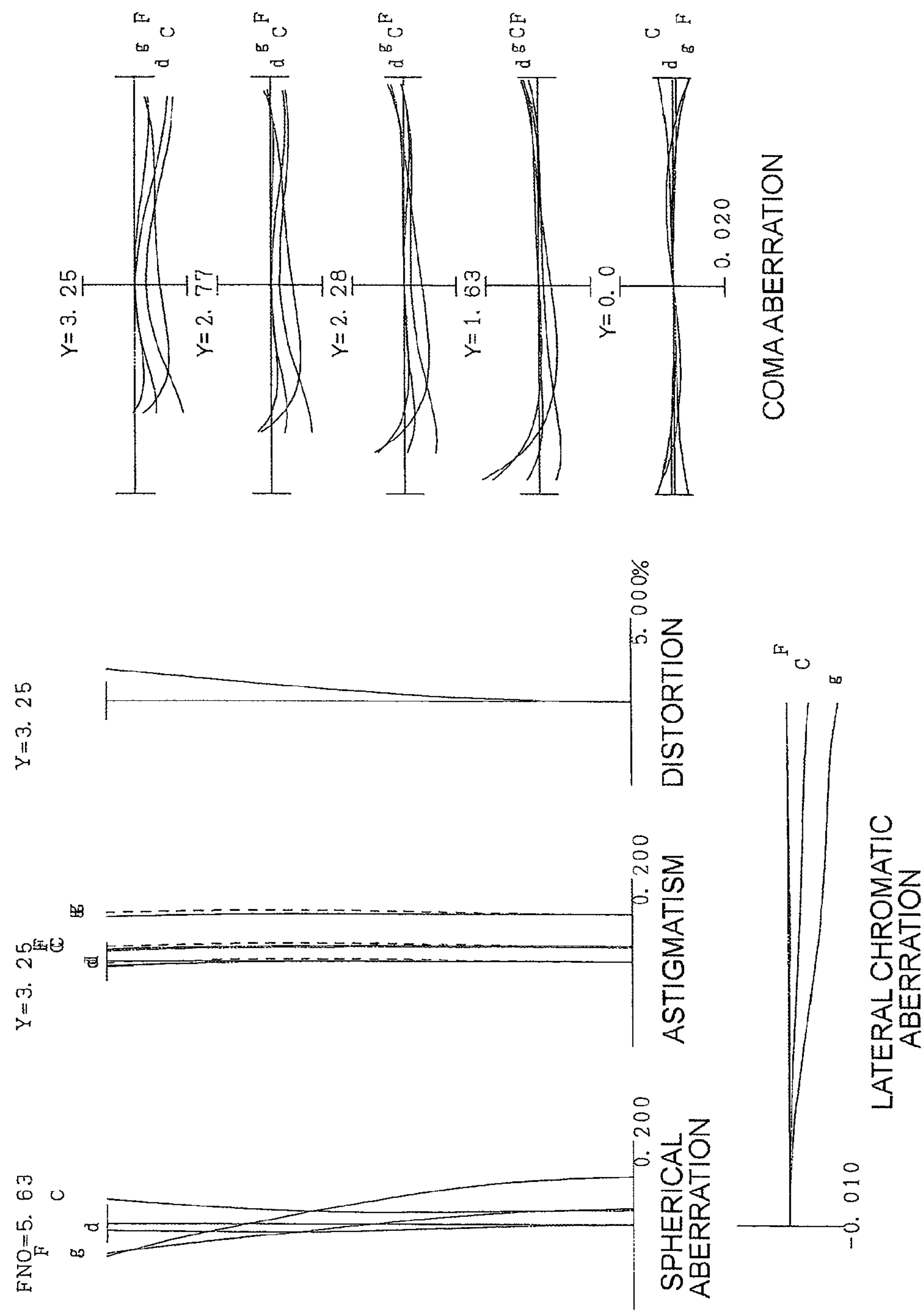

FIG. 5 and FIG. 6 are graphs showing various aberrations of the zoom lens ZL according to Example 2. In other words, FIG. 5A are graphs showing various aberrations of the zoom lens ZL upon focusing on infinity in the wide-angle end state (f=4.10 mm), FIG. 5B are graphs showing various aberrations of the zoom lens ZL upon focusing on infinity in the intermediate focal length state on the wide-angle end side (f=6.00 mm), FIG. 6A are graphs showing various aberrations of the zoom lens ZL upon focusing on infinity in the intermediate focal length state on the telephoto end side (f=17.76 mm), and FIG. 6B are graphs showing various aberrations of the zoom lens ZL upon focusing on infinity in the telephoto end state (f=32.00 mm). As seen in each graph showing aberrations, in Example 2, various aberrations are corrected well in each focal length state from the wide-angle end state to the telephoto end state, indicating the presence of excellent optical performance. As a result, excellent optical performance can be assured for a digital still camera 1 well, by installing the zoom lens Zl of Example 2.

Example 3

Figure 7:
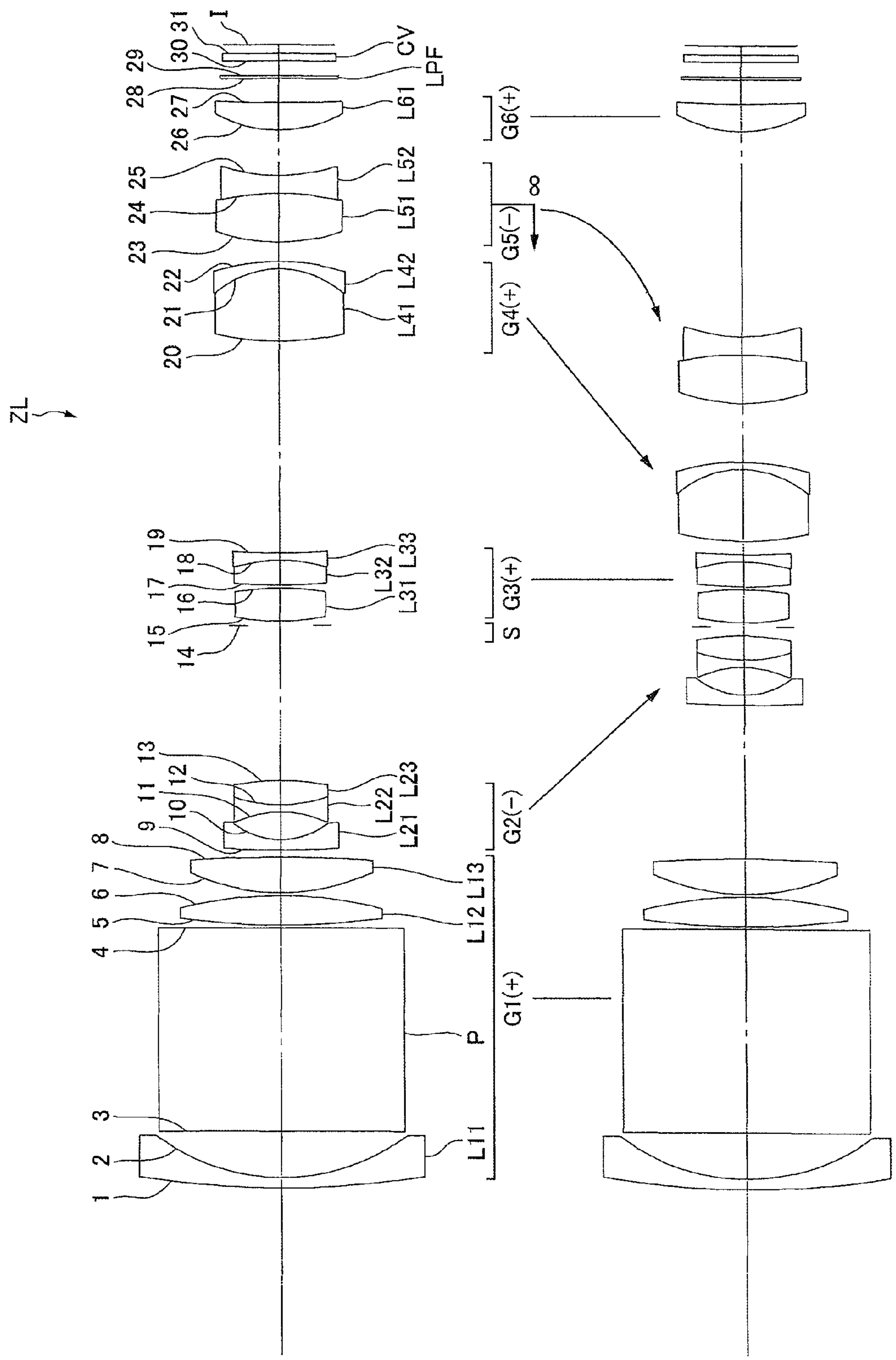
FIG. 7 is a diagram depicting a configuration and zoom locus of a zoom lens according to Example 3.

Example 3 of the present invention will now be described with reference to FIG. 7 to FIG. 9 and Table 3. FIG. 7 is a diagram depicting a configuration and zoom locus of a zoom lens according to Example 3. The zoom lens of Example 3 has a same configuration as the zoom lens of Example 1, and therefore each composing element is denoted with a same reference symbol as Example 1, and detailed description thereof is omitted. The zoom lens according to Example 3 deflects the optical path 90° as shown in FIG. 14, but FIG. 7 shows an expanded state thereof.

Table 3 shows each data of Example 3. The surface numbers 1 to 31 in Table 3 correspond to surfaces 1 to 31 in FIG. 7, and the group numbers G1 to G6 in Table 3 correspond to each lens group G1 to G6 in FIG. 7. In Example 3, each lens surface of the seventh surface, the eighth surface, the tenth surface, the sixteenth surface, the twentieth surface and the twenty sixth surface are formed to be aspherical.

TABLE 3

[Lens Data]

| surface number | r | d | nd | νd |
|---|---|---|---|---|
| object surface | ∞ | | | |
| 1 | 58.0390 | 0.7000 | 1.922860 | 20.88 |
| 2 | 14.0426 | 3.1000 | 1.000000 | |
| 3 | ∞ | 13.7000 | 1.846663 | 23.78 |
| 4 | ∞ | 0.2000 | 1.000000 | |
| 5 | 49.6903 | 2.0000 | 1.516798 | 64.19 |
| 6 | −27.0369 | 0.2000 | 1.000000 | |
| 7(aspherical surface) | 14.2343 | 2.4000 | 1.622625 | 58.16 |
| 8(aspherical surface) | −101.6605 | D8 | 1.000000 | |
| 9 | 63.9166 | 0.7000 | 1.806100 | 40.73 |
| 10(aspherical surface) | 4.9050 | 1.8745 | 1.000000 | |
| 11 | −7.2763 | 0.5000 | 1.882997 | 40.76 |
| 12 | 9.5201 | 1.6500 | 1.922860 | 20.88 |
| 13 | −15.8597 | D13 | 1.000000 | |
| 14(aperture stop) | ∞ | 0.3000 | 1.000000 | |
| 15 | 14.6687 | 2.2500 | 1.743300 | 49.32 |
| 16(aspherical surface) | −19.5185 | 0.2000 | 1.000000 | |
| 17 | 29.8582 | 1.7000 | 1.497820 | 82.52 |
| 18 | −10.9181 | 0.5000 | 1.883000 | 40.81 |
| 19 | 51.7060 | D19 | 1.000000 | |
| 20(aspherical surface) | 18.9938 | 4.9000 | 1.693500 | 53.20 |
| 21 | −6.5744 | 0.5000 | 1.903658 | 31.31 |
| 22 | −15.1514 | D22 | 1.000000 | |
| 23 | 12.6125 | 3.3000 | 1.497820 | 82.52 |
| 24 | −19.3181 | 1.2000 | 1.903658 | 31.31 |
| 25 | 11.5747 | D25 | 1.000000 | |
| 26(aspherical surface) | 8.5755 | 1.8500 | 1.524440 | 56.21 |
| 27 | 86.6991 | 1.6300 | 1.000000 | |
| 28 | ∞ | 0.2100 | 1.516330 | 64.14 |
| 29 | ∞ | 1.0000 | 1.000000 | |
| 30 | ∞ | 0.5000 | 1.516330 | 64.14 |
| 31 | ∞ | Bf | 1.000000 | |
| image plane | ∞ | | | |

[Aspherical Data]

seventh surface

κ = 1.0000, A4 = −2.38570E−05, A6 = −1.49060E−07,
A8 = 0.00000E+00, A10 = 0.00000E+00 eighth surface

κ = 1.0000, A4 = −7.03800E−06, A6 = 0.00000E+00,
A8 = 0.00000E+00, A10 = 0.00000E+00 tenth surface

κ = 1.0000, A4 = −4.40790E−04, A6 = −1.25500E−05,
A8 = −4.12680E−07, A10 = 0.00000E+00 sixteenth surface

κ = 1.0000, A4 = 4.69170E−05, A6 = 0.00000E+00, A8 = 0.00000E+00,
A10 = 0.00000E+00 twentieth surface

κ = 1.0000, A4 = −9.32480E−06, A6 = −5.58800E−08,
A8 = 5.33690E−08, A10 = 0.00000E+00 twenty sixth surface

κ = 1.0000, A4 = −1.31670E−04, A6 = 1.49390E−06,
A8 = 0.00000E+00, A10 = 0.00000E+00

[General Data]
zoom ratio = 7.805

| | wide-angle end | intermediate position | intermediate position | telephoto end |
|---|---|---|---|---|
| f | 4.10000 | 5.99996 | 17.75997 | 31.99994 |
| FNo | 4.00929 | 4.18625 | 4.86334 | 6.40075 |
| ω | 40.42448 | 28.29348 | 10.21884 | 5.68029 |
| Y | 3.25000 | 3.25000 | 3.25000 | 3.25000 |
| TL | 77.214 | 77.214 | 77.214 | 77.214 |
| Bf | 3.6983 | 3.6981 | 3.6982 | 3.6981 |

[Zooming Data]

| variable distance | wide-angle end | intermediate position | intermediate position | telephoto end |
|---|---|---|---|---|
| D8 | 0.50000 | 3.21254 | 8.92714 | 10.43159 |
| D13 | 10.53161 | 7.81906 | 2.10446 | 0.60000 |
| D19 | 14.38825 | 11.48807 | 5.86768 | 0.90000 |
| D22 | 1.30000 | 2.35410 | 6.06082 | 4.00000 |
| D25 | 3.07151 | 4.91759 | 6.83126 | 13.85978 |

[Zoom Lens Group Data]

TABLE 3-continued

| group number | first surface of group | focal length of group |
|---|---|---|
| G1 | 1 | 13.50435 |
| G2 | 9 | −4.84881 |
| G3 | 15 | 16.69536 |
| G4 | 20 | 16.35596 |
| G5 | 23 | −20.00211 |
| G6 | 26 | 18.00000 |

[Conditional Expression Correspondence Value]

conditional expression (1)fw/PL = 0.29927
conditional expression (2)fG1/ft = 0.42201
conditional expression (3)fL12/fL13 = 1.69110

In this way, all the conditional expressions (1) to (3) are satisfied in this example.

Figure 8A:
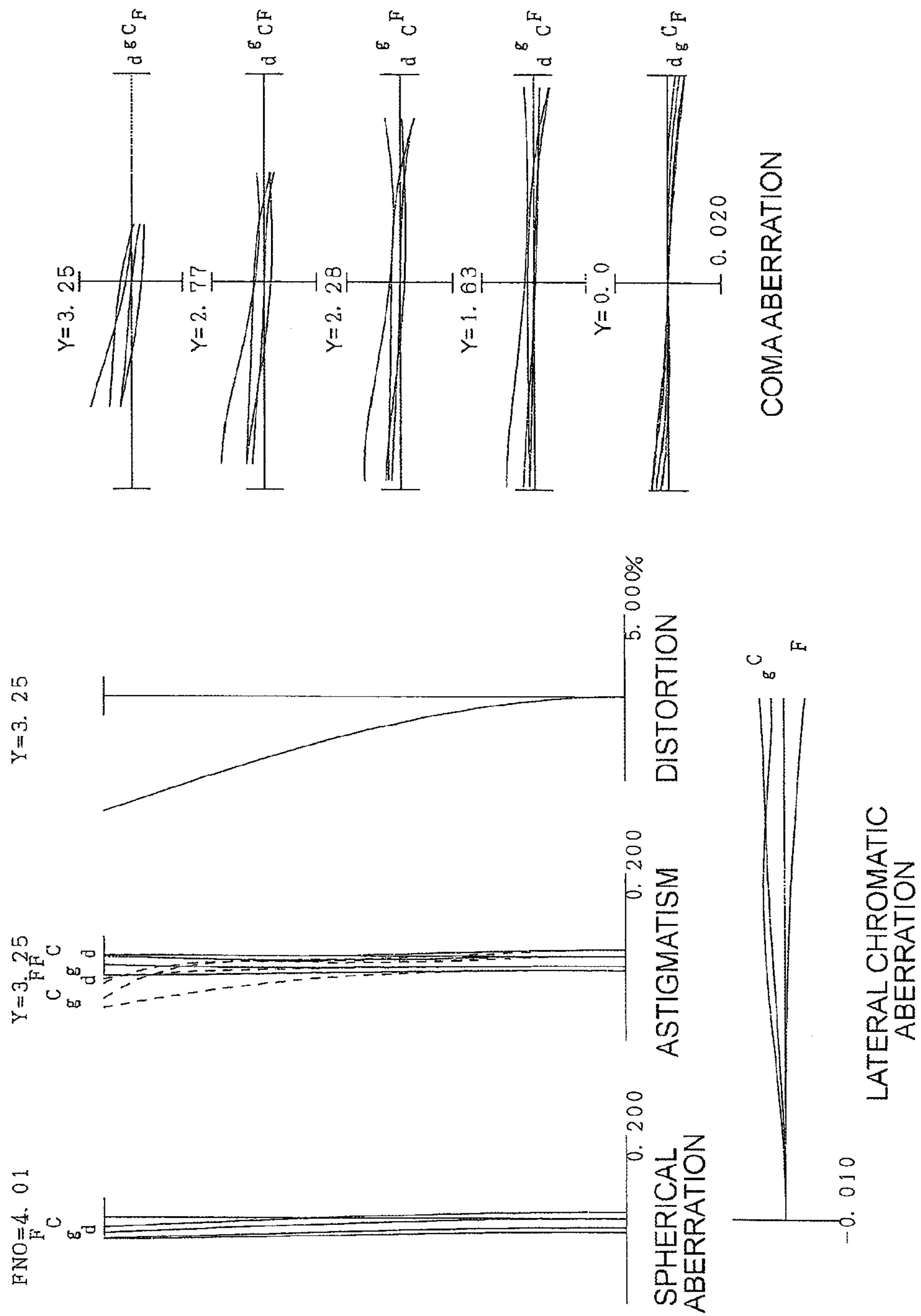
FIG. 8A are graphs showing various aberrations of the zoom lens according to Example 3 upon focusing on infinity in the wide-angle end state, and FIG. 8B are graphs showing various aberrations of the zoom lens upon focusing on infinity in the intermediate focal length state on the wide-angle end side.
Figure 8B:
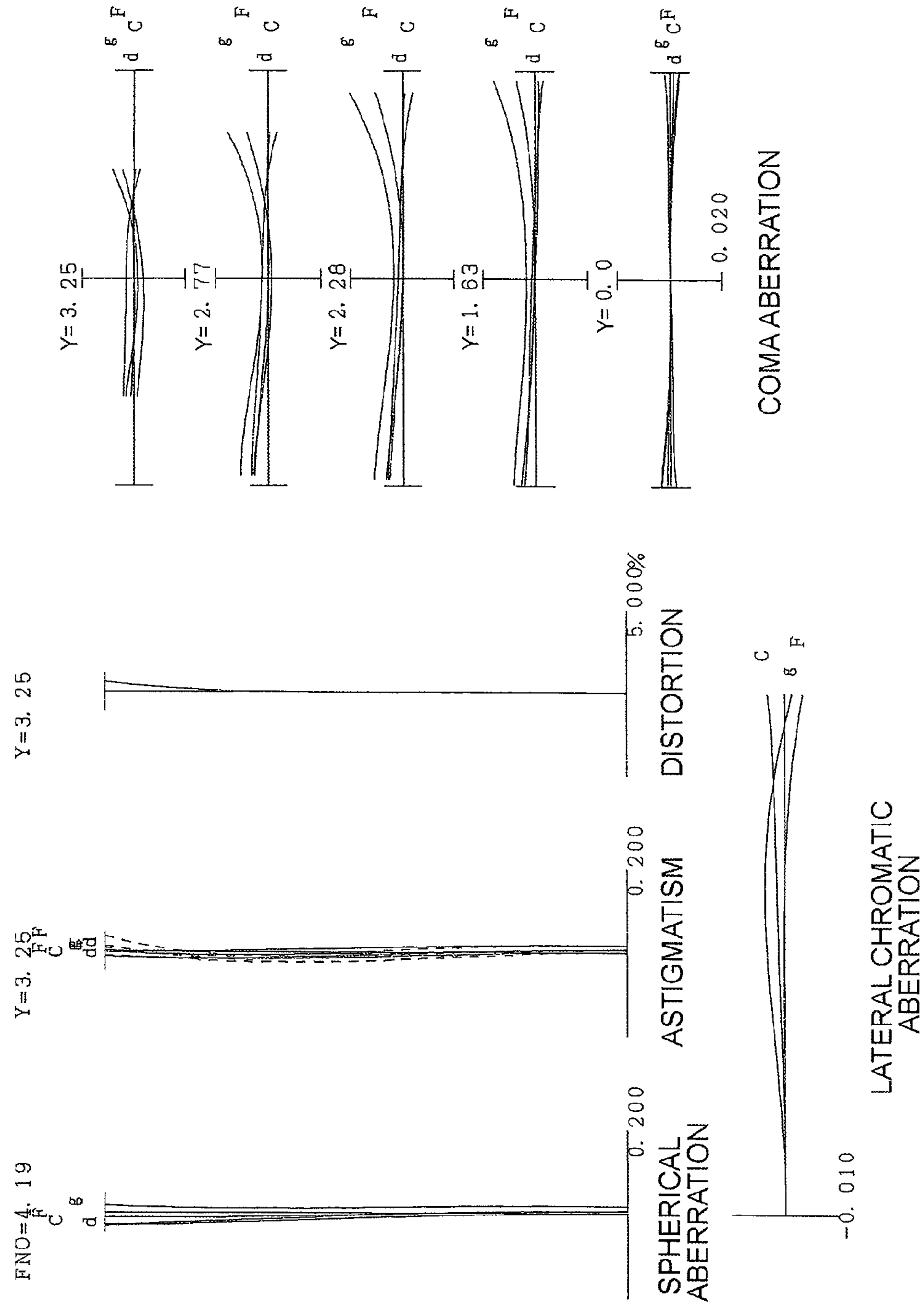
Figure 9A:
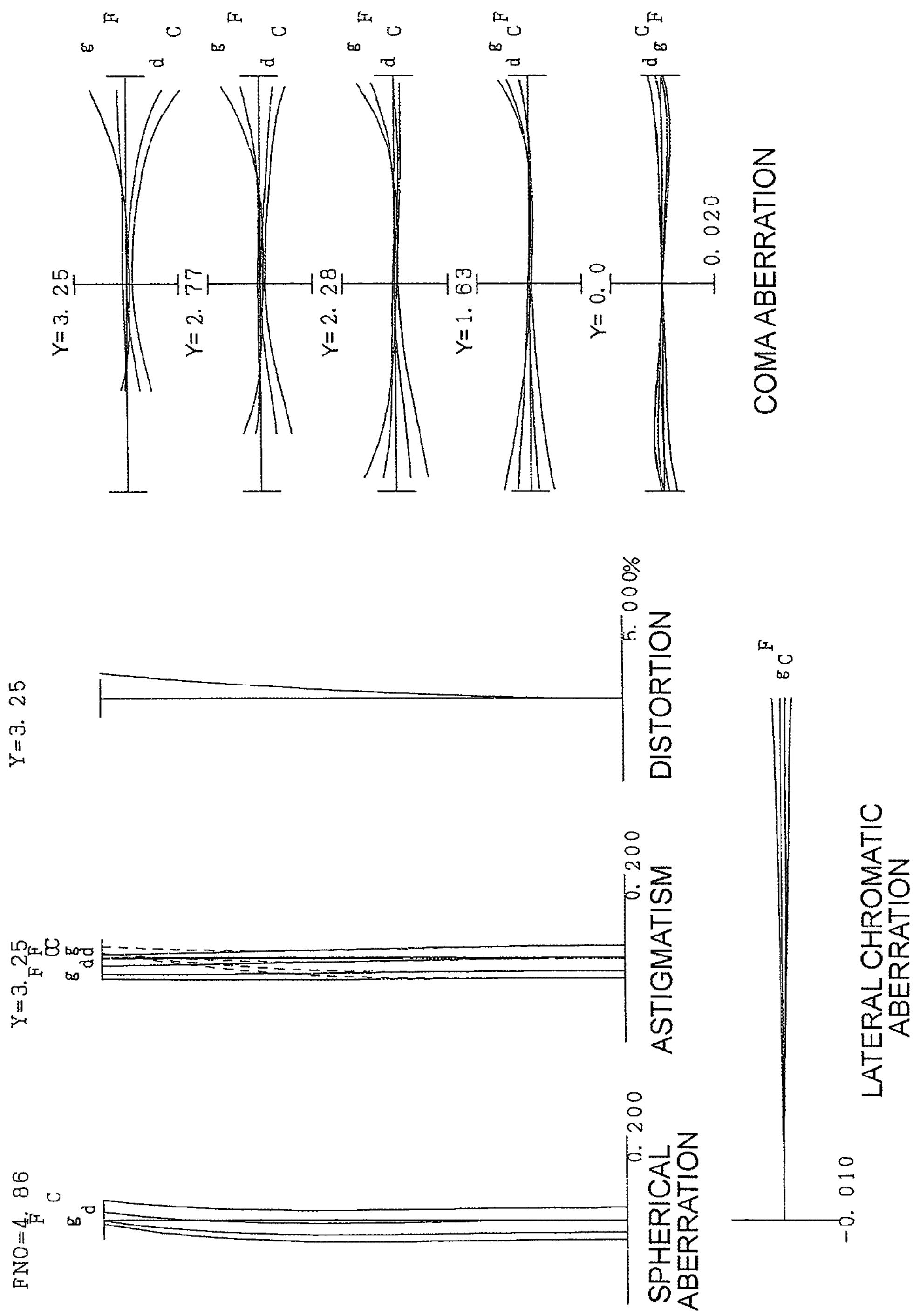
FIG. 9A are graphs showing various aberrations of the zoom lens according to Example 3 upon focusing on infinity in the intermediate focal length state on the telephoto end side, and FIG. 9B are graphs showing various aberrations of the zoom lens upon focusing on infinity in the telephoto end state.
Figure 9B:
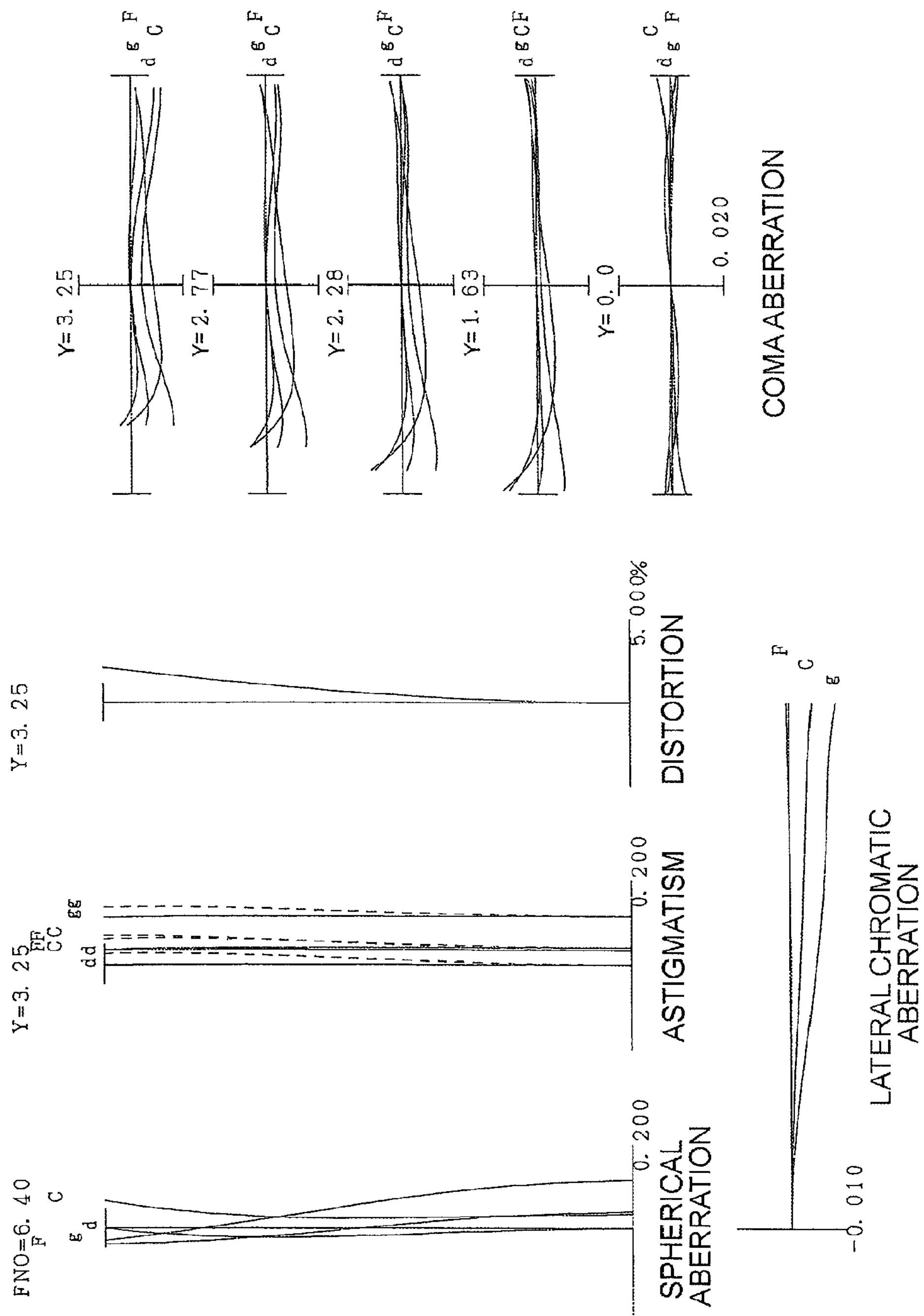

FIG. 8 and FIG. 9 are graphs showing various aberrations of the zoom lens ZL according to Example 3. In other words, FIG. 8A are graphs showing various aberrations of the zoom lens ZL upon focusing on infinity in the wide-angle end state (f=4.10 mm), FIG. 8B are graphs showing various aberrations of the zoom lens ZL upon focusing on infinity in the intermediate focal length state on the wide-angle end side (f=6.00 mm), FIG. 9A are graphs showing various aberrations of the zoom lens ZL upon focusing on infinity in the intermediate focal length state on the telephoto end side (f=17.76 mm), and FIG. 9B are graphs showing various aberrations of the zoom lens ZL upon focusing on infinity in the telephoto end state (f=32.00 mm). As seen in each graph showing aberrations, in Example 3, various aberrations are corrected well in each focal length state from the wide-angle end state to the telephoto end state, indicating the presence of excellent optical performance. As a result, excellent optical performance can be assured for a digital still camera 1 well, by installing the zoom lens Zl of Example 3.

Example 4

Figure 10:
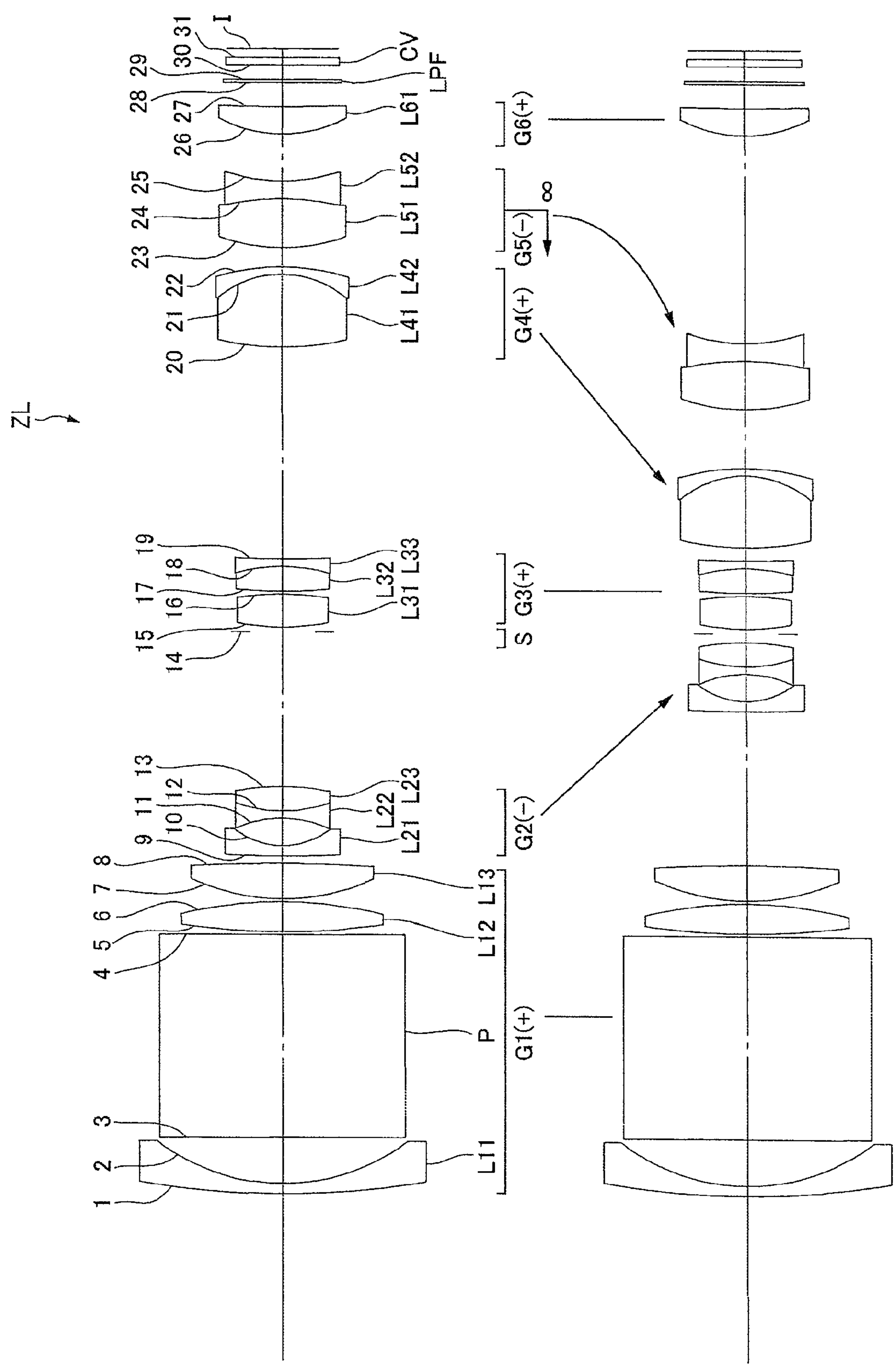
FIG. 10 is a diagram depicting a configuration and zoom locus of a zoom lens according to Example 4.

Example 4 of the present invention will now be described with reference to FIG. 10 to FIG. 12 and Table 4. FIG. 10 is a diagram depicting a configuration and zoom locus of a zoom lens according to Example 4. The zoom lens of Example 4 has a same configuration as the zoom lens of Example 1, and therefore each composing element is denoted with a same reference symbol as Example 1, and detailed description thereof is omitted. The zoom lens according to Example 4 deflects the optical path 90° as shown in FIG. 14, but FIG. 10 shows an expanded state thereof.

Table 4 shows each data of Example 4. The surface numbers 1 to 31 in Table 4 correspond to surfaces 1 to 31 in FIG. 10, and the group numbers G1 to G6 in Table 4 correspond to each lens group G1 to G6 in FIG. 10. In Example 4, each lens surface of the seventh surface, the eighth surface, the tenth surface, the sixteenth surface, the twentieth surface and the twenty sixth surface are formed to be aspherical.

TABLE 4

[Lens Data]

| surface number | r | d | nd | νd |
|---|---|---|---|---|
| object surface | ∞ | | | |
| 1 | 55.6414 | 0.7000 | 1.922860 | 20.88 |
| 2 | 13.9069 | 3.1000 | 1.000000 | |
| 3 | ∞ | 13.7000 | 1.846663 | 23.78 |
| 4 | ∞ | 0.2000 | 1.000000 | |
| 5 | 48.6812 | 2.0000 | 1.516798 | 64.19 |
| 6 | −26.9767 | 0.2000 | 1.000000 | |
| 7(aspherical surface) | 14.2727 | 2.4000 | 1.622625 | 58.16 |
| 8(aspherical surface) | −106.3665 | D8 | 1.000000 | |
| 9 | 74.0072 | 0.7000 | 1.806100 | 40.73 |
| 10(aspherical surface) | 4.9320 | 1.8609 | 1.000000 | |
| 11 | −7.3524 | 0.5000 | 1.882997 | 40.76 |
| 12 | 9.4707 | 1.6500 | 1.922860 | 20.88 |
| 13 | −15.9390 | D13 | 1.000000 | |
| 14(aperture stop) | ∞ | 0.3000 | 1.000000 | |
| 15 | 14.9489 | 2.2500 | 1.743300 | 49.32 |
| 16(aspherical surface) | −19.0515 | 0.2000 | 1.000000 | |
| 17 | 32.8559 | 1.7000 | 1.497820 | 82.52 |
| 18 | −10.5469 | 0.5000 | 1.883000 | 40.81 |
| 19 | 61.4287 | D19 | 1.000000 | |
| 20(aspherical surface) | 18.8124 | 4.9000 | 1.693500 | 53.20 |
| 21 | −6.6456 | 0.5000 | 1.903658 | 31.31 |
| 22 | −15.1067 | D22 | 1.000000 | |
| 23 | 12.8028 | 3.3000 | 1.497820 | 82.52 |
| 24 | −18.1145 | 1.2000 | 1.903658 | 31.31 |
| 25 | 11.7534 | D25 | 1.000000 | |
| 26(aspherical surface) | 8.8139 | 1.8500 | 1.524440 | 56.21 |
| 27 | 123.3104 | 1.6300 | 1.000000 | |
| 28 | ∞ | 0.2100 | 1.516330 | 64.14 |
| 29 | ∞ | 1.0000 | 1.000000 | |
| 30 | ∞ | 0.5000 | 1.516330 | 64.14 |
| 31 | ∞ | Bf | 1.000000 | |
| image plane | ∞ | | | |

[Aspherical Data]

seventh surface

κ = 1.0000, A4 = −2.50170E−05, A6 = −1.58630E−07, A8 = 0.00000E+00, A10 = 0.00000E+00 eighth surface

κ = 1.0000, A4 = −9.88550E−06, A6 = 0.00000E+00, A8 = 0.00000E+00, A10 = 0.00000E+00 tenth surface

κ = 1.0000, A4 = −4.49010E−04, A6 = −1.13940E−05, A8 = −3.80340E−07, A10 = 0.00000E+00 sixteenth surface

κ = 1.0000, A4 = 4.09830E−05, A6 = 0.00000E+00, A8 = 0.00000E+00, A10 = 0.00000E+00 twentieth surface

κ = 1.0000, A4 = −1.31460E−05, A6 = 8.84000E−09, A8 = 4.83960E−08, A10 = 0.00000E+00 twenty sixth surface

κ = 1.0000, A4 = −1.32240E−04, A6 = 1.67760E−06, A8 = 0.00000E+00, A10 = 0.00000E+00

[General Data]
zoom ratio = 7.805

| | wide-angle end | intermediate position | intermediate position | telephoto end |
|---|---|---|---|---|
| f | 4.10000 | 6.01295 | 17.75997 | 31.99995 |
| FNo | 4.00745 | 4.15343 | 4.88092 | 6.42783 |
| ω | 40.42572 | 28.22880 | 10.21801 | 5.68165 |
| Y | 3.25000 | 3.25000 | 3.25000 | 3.25000 |
| TL | 77.3285 | 77.3285 | 77.3285 | 77.3285 |
| Bf | 3.6983 | 3.6982 | 3.6983 | 3.6982 |

[Zooming Data]

| variable distance | wide-angle end | intermediate position | intermediate position | telephoto end |
|---|---|---|---|---|
| D8 | 0.50000 | 3.28898 | 8.92460 | 10.43231 |
| D13 | 10.53231 | 7.74333 | 2.10771 | 0.60000 |
| D19 | 14.42183 | 11.61854 | 5.90228 | 0.90000 |
| D22 | 1.30000 | 2.46616 | 5.86308 | 4.00000 |
| D25 | 3.16516 | 4.80230 | 7.12163 | 13.98701 |

TABLE 4-continued

| [Zoom Lens Group Data] | | |
|---|---|---|
| group number | first surface of group | focal length of group |
| G1 | 1 | 13.54810 |
| G2 | 9 | −4.85285 |
| G3 | 15 | 16.81905 |
| G4 | 20 | 16.15080 |
| G5 | 23 | −19.60494 |
| G6 | 26 | 18.00000 |

[Conditional Expression Correspondence Value]

conditional expression (1)fw/PL = 0.29927
conditional expression (2)fG1/ft = 0.42338
conditional expression (3)fL12/fL13 = 1.66410

In this way, all the conditional expressions (1) to (3) are satisfied in this example.

Figure 11A:
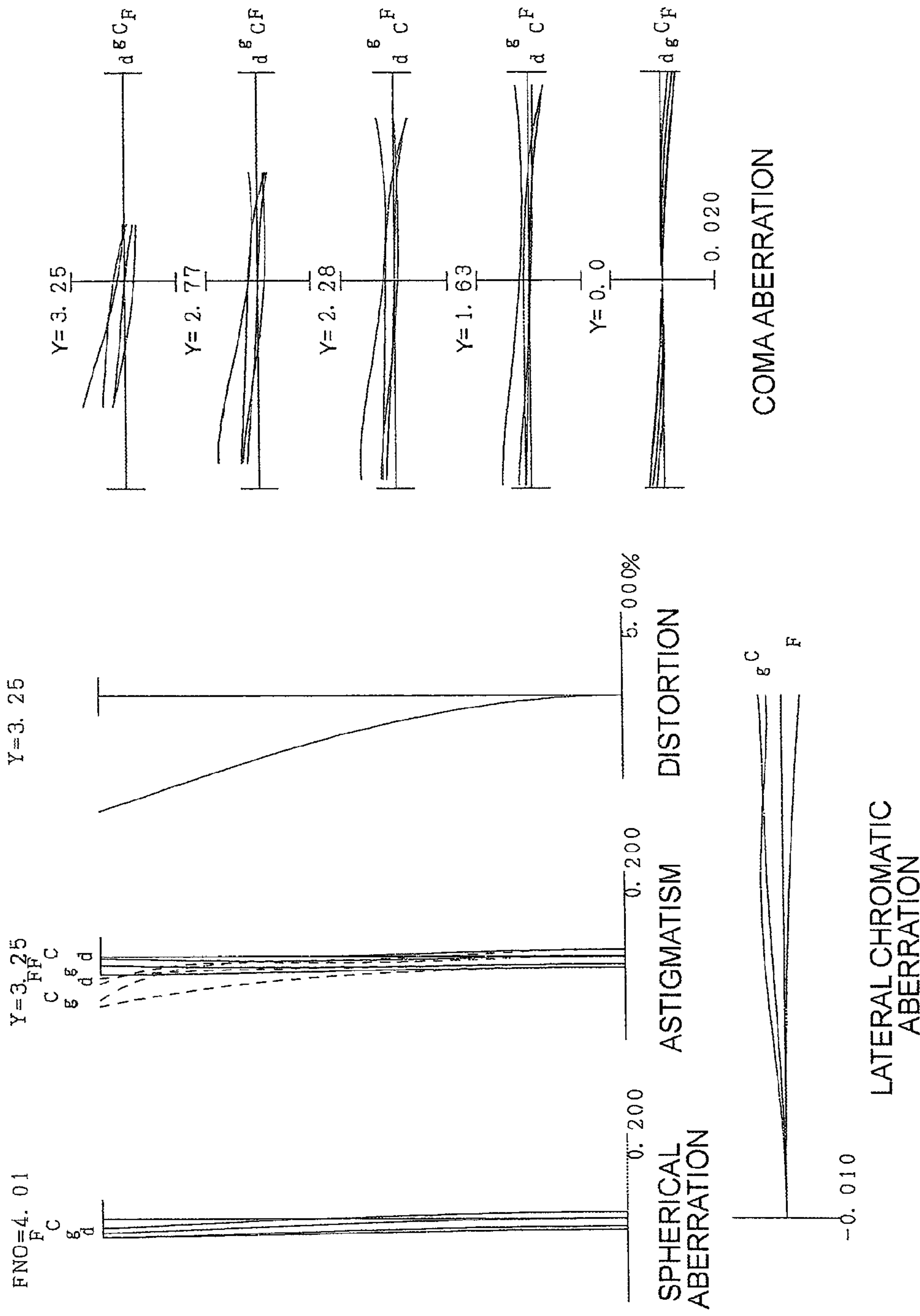
FIG. 11A are graphs showing various aberrations of the zoom lens according to Example 4 upon focusing on infinity in the wide-angle end state, and FIG. 11B are graphs showing various Aberrations of the zoom lens upon focusing on infinity in the intermediate focal length state on the wide-angle end side.
Figure 11B:
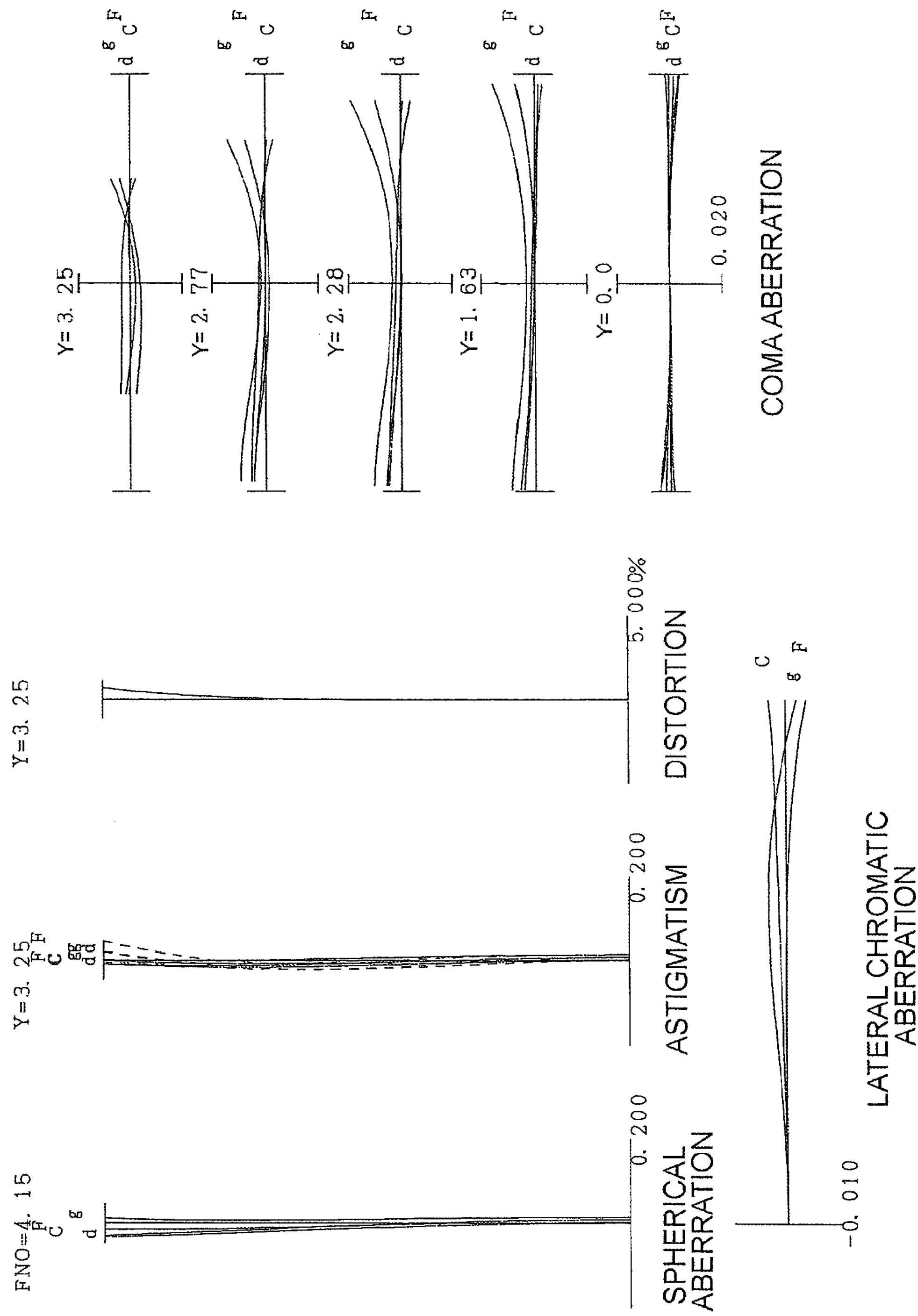
Figure 12A:
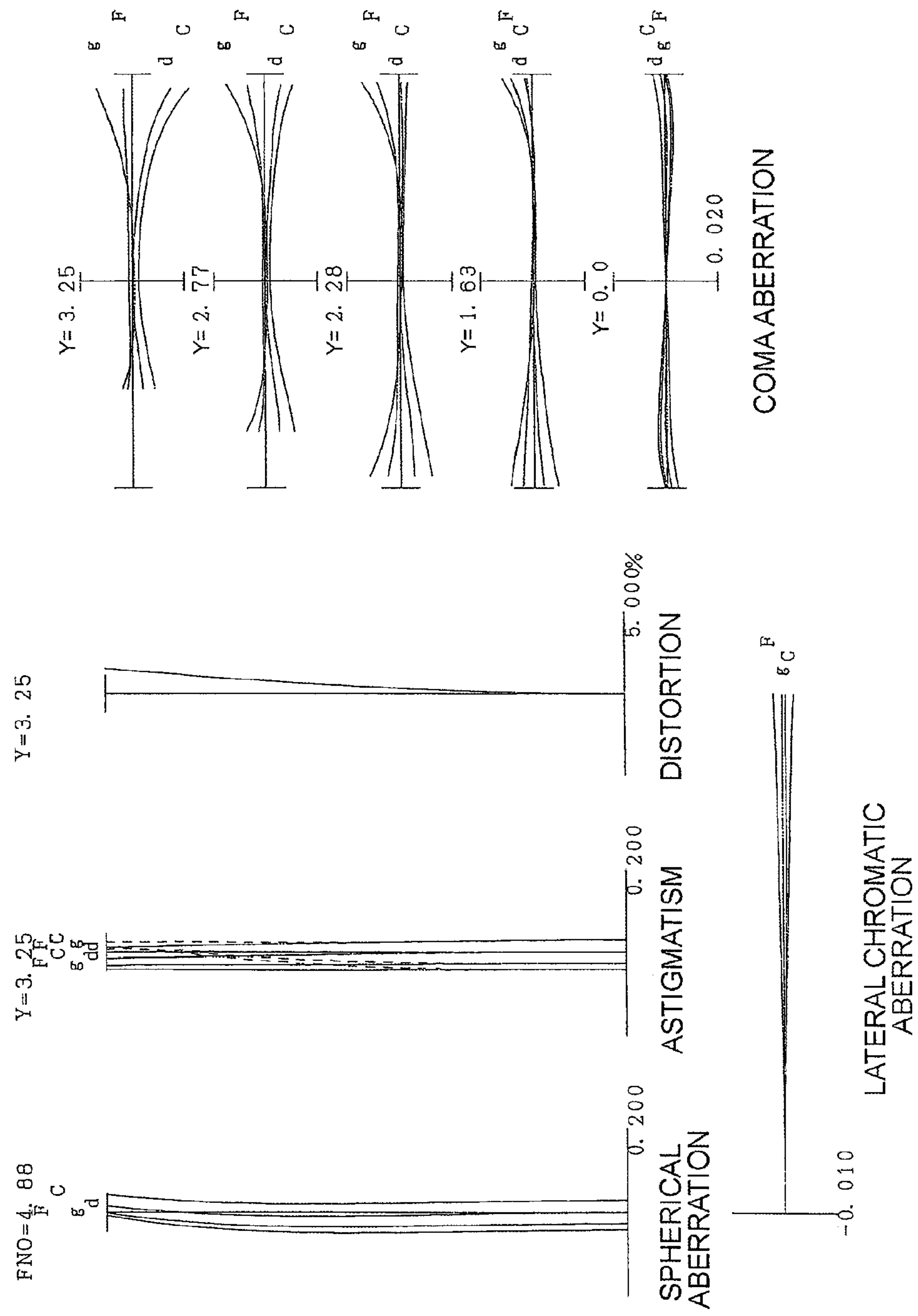
FIG. 12A are graphs showing various aberrations of the zoom lens according to Example 4 upon focusing on infinity in the intermediate focal length state on the telephoto end side, and FIG. 12B are graphs showing various aberrations of the zoom lens upon focusing on infinity in the telephoto end state.
Figure 12B:
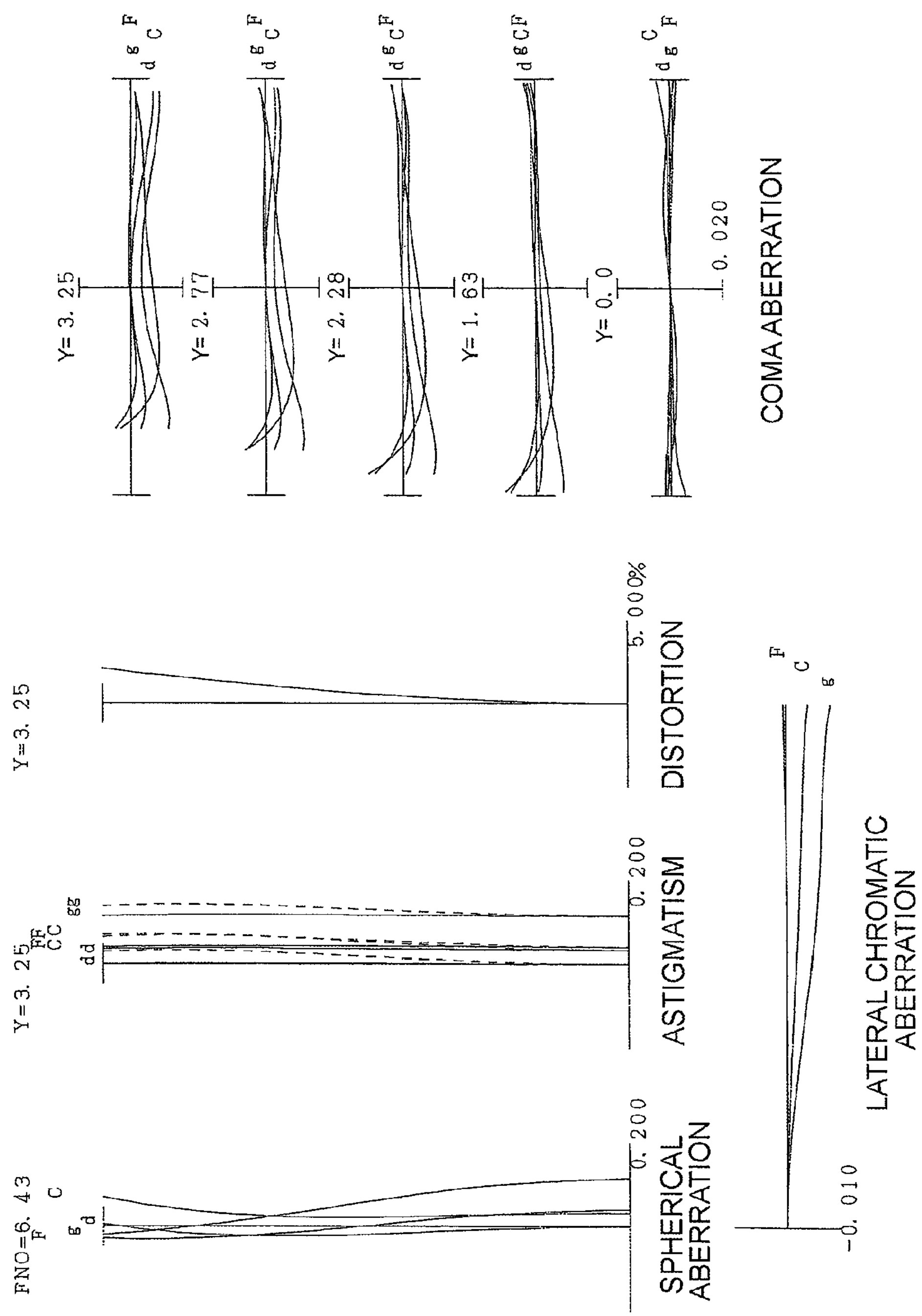

FIG. 11 and FIG. 12 are graphs showing various aberrations of the zoom lens ZL according to Example 4. In other words, FIG. 11A are graphs showing various aberrations of the zoom lens ZL upon focusing on infinity in the wide-angle end state (f=4.10 mm), FIG. 11B are graphs showing various aberrations of the zoom lens ZL upon focusing on infinity in the intermediate focal length state on the wide-angle end side (f=6.01 mm), FIG. 12A are graphs showing various aberrations of the zoom lens ZL upon focusing on infinity in the intermediate focal length state on the telephoto end side (f=17.76 mm), and FIG. 12B are graphs showing various aberrations of the zoom lens ZL upon focusing on infinity in the telephoto end state (f=32.00 mm). As seen in each graph showing aberrations, in Example 4, various aberrations are corrected well in each focal length state from the wide-angle end state to the telephoto end state, indicating the presence of excellent optical performance. As a result, excellent optical performance can be assured for a digital still camera 1 well, by installing the zoom lens Zl of Example 3.

According to each example, a zoom lens which is suitable for an optical apparatus using a solid-state image sensor (e.g. video camera, digital still camera), and which is ultracompact, and has a high image quality while having an ×7 or higher zoom ratio, can be implemented.

In the above embodiment, the following content can be adopted within a range where the optical performance is not diminished.

In each of the above mentioned examples, a zoom lens comprised of six lens groups was shown, but the present invention can also be applied to a configuration using the different number of lens groups, such as seven groups. In the configuration, a lens or a lens group may be added to the side closest to the object, or a lens or a lens group may be added to the side closest to the image. A lens group refers to a portion having at least one lens isolated by an air space which changes upon zooming.

A single or a plurality of lens group(s) or a partial lens group may be designed to be a focusing lens group which performs focusing from an object at infinity to an object at close distance by moving in the optical axis direction. This focusing lens group can be applied to auto focus, and is also suitable for driving a motor for auto focusing (e.g. driving using an ultrasonic motor). It is partially preferable that at least a part of the fourth lens group or the fifth lens group be designed to be the focusing lens group.

A lens group or a partial lens group may be designed to be a vibration-isolating lens group, which corrects image blurs generated by hand motion by moving the lens group or the partial lens group so as to have components orthogonal to the optical axis, or rotating (oscillating) the lens group or the partial lens group in an in-plane direction including the optical axis. It is particularly preferable that at least a part of the third lens group be designed to be the vibration-isolating lens group.

The lens surface may be formed to be a spherical surface or a plane, or an aspherical surface. If the lens surface is a spherical surface or a plane, then lens processing, assembly and adjustment are easy, and deterioration of optical performance, due to an error in processing, assembly and adjustment, can be prevented, which is desirable. Furthermore, even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite-aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop be disposed near the third lens group, but the role of the aperture stop may be substituted by the frame of the lens, without disposing a separate element as the aperture stop.

Each lens surface may be coated by an anti-reflection film which has high transmittance in a wide wavelength region, in order to decrease flares and ghosts, and implement a high optical performance with high contrast.

The zoom ratio of the zoom lens (variable power optical system) of the present embodiment is about 5 to 10.

In the zoom lens (variable power optical system) of the present embodiment, it is preferable that the first lens group have two positive lens components and one negative lens component. It is also preferable that the second lens group have two negative lens components. It is also preferable that the third lens group have one positive lens component and one negative lens component. It is also preferable that the fourth lens group have one positive lens component. It is also preferable that the fifth lens group have one negative lens component. It is also preferable that the sixth lens group have one positive lens component.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens including an optical element for deflecting an optical path, comprising, in order from an object:

a first lens group having positive refractive power; a second lens group having negative refractive power; a third lens group having positive refractive power; a fourth lens group having positive refractive power; a fifth lens group having negative refractive power; and a sixth lens group, and a following conditional expression being satisfied:

$$0.10<fw/PL<0.45$$

where fw denotes a focal length of the zoom lens in a wide-angle end state, and PL denotes an optical path length of the optical element for deflecting the optical path.

2. The zoom lens according to claim 1, wherein a following conditional expression is satisfied:

$$0.20 < fG1/ft < 0.55$$

where fG1 denotes a focal length of the first lens group, and ft denotes a focal length of the zoom lens in a telephoto end state.

3. The zoom lens according to claim 1, wherein the first lens group comprises, in order from the object, a negative lens, the optical element for deflecting the optical path, a first positive lens and a second positive lens.

4. The zoom lens according to claim 1, wherein a following conditional expression is satisfied:

$$0.9 < fL12/fL13 < 5.0$$

where fL13 denotes a focal length of a positive lens closest to an image among the first lens group, and fLl2 denotes a focal length of a positive lens closer to the object than the positive lens closest to the image among the first lens group.

5. The zoom lens according to claim 1, wherein the first lens group, the third lens group and the sixth lens group are fixed respectively upon zooming from the wide-angle end state to the telephoto end state.

6. The zoom lens according to claim 1, wherein an aperture stop for adjusting a quantity of light is disposed between the second lens group and the third lens group.

7. The zoom lens according to claim 1, wherein the second lens group comprises, in order from the object, a first negative lens, a second negative lens and a positive lens.

8. The zoom lens according to claim 1, wherein at least one of the fourth lens group and the fifth lens group is constituted only by a cemented lens.

9. The zoom lens according to claim 1, wherein at least one of the fourth lens group and the fifth lens group is constituted only by a cemented lens of a positive lens and a negative lens.

10. An optical apparatus comprising a zoom lens for forming an image of an object on a predetermined plane, and the zoom lens being the zoom lens according to claim 1.

11. A method for manufacturing a zoom lens including an optical element for deflecting an optical path, said method comprising:

providing, in order from an object: a first lens group including the optical element for deflecting the optical path and having positive refractive power; a second lens group having negative refractive power; a third lens group having positive refractive power; a fourth lens group having positive refractive power; a fifth lens group having negative refractive power; and a sixth lens group, with the following conditional expression being satisfied:

$$0.10 < fw/PL < 0.45$$

where fw denotes a focal length of the zoom lens in a wide-angle end state, and PL denotes an optical path length of the optical element for deflecting the optical path.

12. The method for manufacturing a zoom lens according to claim 11, wherein a following conditional expression is satisfied:

$$0.20 < fG1/ft < 0.55$$

where fG1 denotes a focal length of the first lens group, and ft denotes a focal length of the zoom lens in a telephoto end state.

13. The method for manufacturing a zoom lens according to claim 11, wherein the first lens group comprises, in order from the object, a negative lens, the optical element for deflecting the optical path, a first positive lens and a second positive lens.

14. The method for manufacturing a zoom lens according to claim 11, wherein a following conditional expression is satisfied:

$$0.9 < fL12/fL13 < 5.0$$

where fL13 denotes a focal length of a positive lens closest to an image among the first lens group, and fL12 denotes a focal length of a positive lens closer to the object than the positive lens closest to the image among the first lens group.

* * * * *